US012534160B2

(12) United States Patent
Sinn et al.

(10) Patent No.: US 12,534,160 B2
(45) Date of Patent: Jan. 27, 2026

(54) FRAMEWORK AND LOAD-BEARING STRUCTURES CONSTRUCTED FROM IT

(71) Applicant: SINN Power GmbH, Gauting (DE)

(72) Inventors: Philipp Sinn, Gauting (DE); Dominik Schwaiger, Gauting (DE); Patrick Boscher, Gauting (DE)

(73) Assignee: SINN Power GmbH, Gauting (DE)

( * ) Notice: Subject to any disclaimer, the term of this patent is extended or adjusted under 35 U.S.C. 154(b) by 670 days.

(21) Appl. No.: 17/907,077

(22) PCT Filed: Feb. 9, 2021

(86) PCT No.: PCT/EP2021/053112
§ 371 (c)(1),
(2) Date: Sep. 22, 2022

(87) PCT Pub. No.: WO2021/190815
PCT Pub. Date: Sep. 30, 2021

(65) Prior Publication Data
US 2024/0208618 A1    Jun. 27, 2024

(30) Foreign Application Priority Data

Mar. 23, 2020   (WO) ................ PCT/EP2020/058041

(51) Int. Cl.
*B63B 1/14*      (2006.01)
*B63B 1/12*      (2006.01)
(Continued)

(52) U.S. Cl.
CPC ............... *B63B 1/14* (2013.01); *B63B 1/125* (2013.01); *B63B 5/24* (2013.01); *B63B 35/38* (2013.01);
(Continued)

(58) Field of Classification Search
CPC .. B63B 1/00; B63B 1/125; B63B 1/14; B63B 5/00; B63B 5/24; B63B 35/00; B63B 35/38; B63B 75/00
(Continued)

(56) References Cited

U.S. PATENT DOCUMENTS 1,418,332 A * 6/1922 Schweiger .............. E06B 11/02
                                                                    256/73
3,970,024 A    7/1976 Fisher
(Continued)

FOREIGN PATENT DOCUMENTS

DE         3630411 A1    9/1987
WO         8703170 A1    6/1987
(Continued)

*Primary Examiner* — Lars A Olson

(57) ABSTRACT

Framework structure and method for modular construction of an offshore framework structure comprising frameworks with a first bar functioning as a floating body, a second bar, with two posts for parallel support of the bars and two bands for tensioning the framework. A connection element is arranged at each end of the bars, each of which has a single flange for attaching a single bar to the connection element. In the connection elements, receiving areas are arranged transversely to the longitudinal direction of the bars for attaching the posts. The connection elements are constructed with respect to the longitudinal direction of the bars in such a way that an extension is configured on one side and a holder can be arranged on the opposite side so that the extension of a connection element of a framework can be joined with the holder of another connection element of a further framework.

30 Claims, 15 Drawing Sheets

Figure 1:
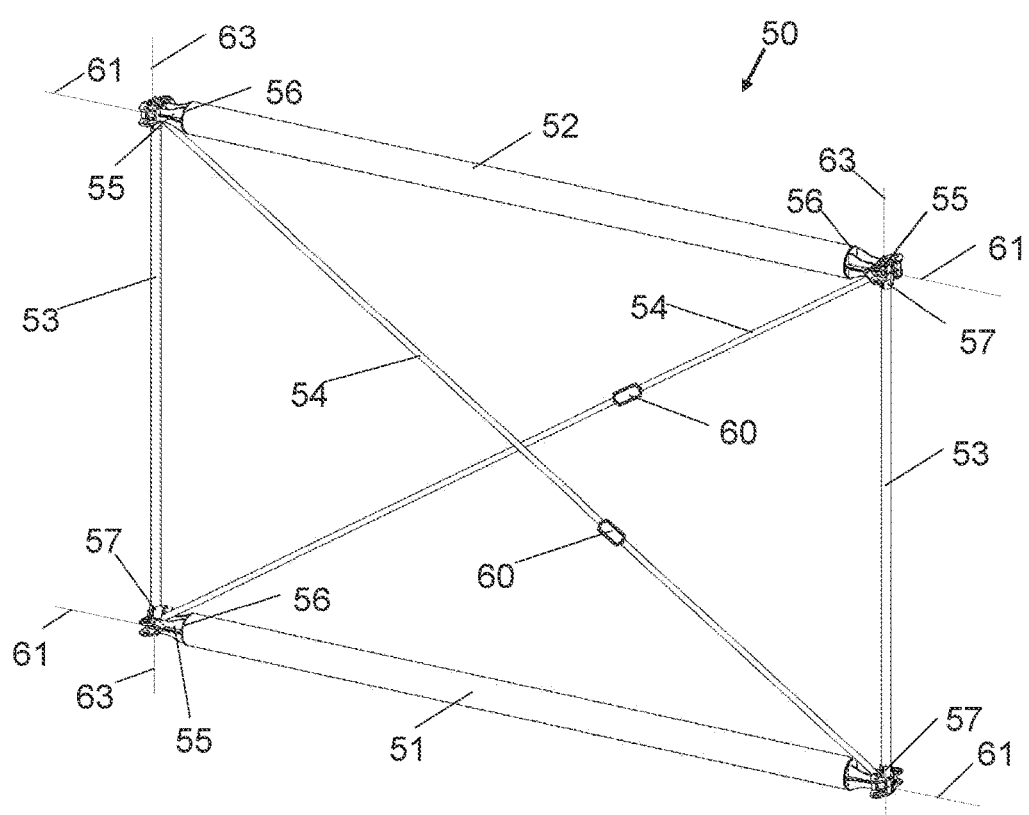

(51) Int. Cl.
*B63B 5/24* (2006.01)
*B63B 35/38* (2006.01)
*B63B 75/00* (2020.01)
*B63B 35/44* (2006.01)

(52) U.S. Cl.
CPC ........ *B63B 75/00* (2020.01); *B63B 2001/126* (2013.01); *B63B 35/44* (2013.01); *B63B 2035/4453* (2013.01); *B63B 2035/446* (2013.01); *B63B 2035/4466* (2013.01)

(58) Field of Classification Search
USPC .......................................................... 114/264
See application file for complete search history.

(56) References Cited

U.S. PATENT DOCUMENTS

| | | | |
|---|---|---|---|
| 5,906,172 | A | 5/1999 | Kordes |
| 6,960,047 | B2 * | 11/2005 | Knezek ................... B63B 5/24 |
| | | | 114/241 |
| 2016/0152307 | A1 | 6/2016 | Zhang |

FOREIGN PATENT DOCUMENTS

| | | |
|---|---|---|
| WO | 2011124728 A1 | 10/2011 |
| WO | 2012098564 A1 | 7/2012 |
| WO | 2014027960 A1 | 2/2014 |
| WO | 2016170201 A1 | 10/2016 |
| WO | 2018143818 A1 | 8/2018 |

* cited by examiner

FRAMEWORK AND LOAD-BEARING STRUCTURES CONSTRUCTED FROM IT

The invention concerns buoyant frameworks constructed in a substantially planar manner and buoyant 2- and 3-dimensional load-bearing structures assembled in a modular manner therefrom and a method for modular construction of the same, for example as a load-bearing structure for floating platforms, for example for the mounting of solar panels and wind energy plants, or as a load-bearing structure for wave power plants.

Floating platforms such as platforms supported by floating bodies or pontoons and the like are known in the state of the art in various forms. Many of these structures are complex in their construction and are therefore often assembled on land, to be transported to their place of use in an assembled state. In particular, this limits the size of such platforms.

Support structures with a larger surface area that are assembled offshore are often difficult to manipulate or manoeuvre, especially if they are to be used in the open sea, i.e. in the ocean. In this context, offshore construction in particular requires significant use of auxiliary resources, thereby incurring costs, which can be very high for such extensively planar load-bearing structures.

It is therefore the object of the invention to provide a load-bearing structure which can be constructed with simple means and inexpensively, whereby the load-bearing structure is to be capable of modular construction and extendable. The manufacturing and assembly effort is to be reduced to a minimum, in particular the effort required for offshore assembly. With the load-bearing frame structure according to the invention, it is furthermore to be possible to provide a robust, buoyant load-bearing structure which is flexibly adaptable in terms of its dimensions and load-bearing capacity.

The object is achieved by a buoyant framework configured in a substantially planar manner. Also disclosed is a wave power plant which is constructed in a modular manner from a plurality of framework structures according to the invention, which in turn are constructed in a modular manner from the frameworks according to the invention. In order to achieve the object, a method for connecting at least two frameworks according to the invention is also disclosed.

The base unit according to the invention forms a framework which is intended for the modular construction of an offshore framework structure and is substantially planar in configuration. The framework according to the invention exhibits a first bar which functions as a floating body and a second bar, both of which are supported parallel to each other by means of two lateral posts. The framework can be held in shape respectively diagonally tensioned by means of two bands. To connect the bars to the posts and the bands, connection elements are arranged at the ends of the bars, each with a single flange for attaching the connection elements to the bars. If the first and/or the second bar is made of a hollow body, the flanges can close the bars in a fluid-tight manner so that a volume of air enclosed in them generates a corresponding buoyancy force. If metallic materials are used, this can be done by welding the flanges to the bars, for example. Other customary connections such as screwing or gluing, possibly with seals, are also within the scope of the inventive concept. In a further embodiment, at least the first bar is designed as a fluid-tight hollow body, to the ends of which the connection elements can be attached. In addition to this, however, the second bars and/or the posts can also be configured as fluid-tight hollow bodies; alternatively, the connection elements can close the bars and/or posts in a fluid-tight manner.

Preferably, the bars together with the connection elements fastened to their ends form a unit of the framework according to the invention, in particular pre-assembled on land. In this case, next to the one flange by means of which one end of a bar can be attached to the connection element, the connection elements have receiving areas for attaching the posts to the bars transversely to the longitudinal direction of the bars in order to keep the bars spaced in a parallel manner. Preferably, these lateral posts, which are aligned substantially vertically with the bars, are simply plugged together with the receiving areas. Further preferably, this is done without the use of tools, so that all known types of rigid or articulated plug-in, clamp and clip connections are covered by the inventive concept which are suitable for attaching the posts to the connection elements without tools.

In order to keep the framework of the invention in shape, to tension it and to hold it together as necessary, and therefore also to keep the bars fixed to the posts, bands are used which exhibit tensioning devices. These bands can be attached to securing means on the connection elements and fix the framework diagonally, or hold it in its substantially rectangular shape. The term bands includes tension and lashing belts, as well as struts with a tensioning device, for example with the relevant left/right-hand threads, ropes, etc.

In a preferred embodiment, pins are inserted into the connection elements transversely to the longitudinal direction of the bars and transversely to the longitudinal direction of the posts, whereby the pins are further preferably rotatable but are mounted in the connection elements in an axially fixed manner by the bands inserted therein. In one embodiment of the invention, the framework struts, which are configured as bands, can be divided at the tensioning device and have a collar at the end opposite the tensioning device in each case, the diameter of the collar being greater than that of the transverse borehole of the pin mounted in the connection element. By means of the tensioning device, the bands/framework struts can be joined to each other, i.e. tensioned diagonally to each other, after insertion into the connection elements or into the rotatable pins, in such a way that the framework according to the invention is firmly joined in itself and all components involved are fixed. By means of the rotation capacity of the pins in the connection elements, the framework according to the invention is scalable, since when the bars and/or posts are lengthened, their angle changes along with the length of the framework diagonals.

In one embodiment of the bands according to the invention, latching devices, clamping devices or similar devices are configured at the ends of the bands for positive or non-positive fixing of the bands to the connection elements. These devices serve to fix the bands in the pins rotatably mounted in the connection elements and can be of single-section design. For example, the ends of the bands can have a larger diameter as compared to the inner diameter of the hole made in the pin. To allow the ends of the band to be pushed through the holes made in the pin, slots are provided in the ends of the band to allow elastic deformation of the band ends as they are pushed through. After being pushed through, the elastic deformation of the band ends is reversed and the bands form a positive fit with the pin, e.g. by means of an undercut.

However, the devices for fixing the bands to the pins according to the invention can also be of multi-section design. For example, a latching mechanism can be provided at the end of the bands which, after the band has been pushed through the hole in the pin, is locked by a counterpart, thereby securing the band against falling out.

If tensioning is achieved by means of tension straps as bands, for example, the pins rotatably mounted in the connection elements are unnecessary, since the securing means for the bands are configured in the form of a bushing, an eyelet or a slot, for example.

In one embodiment of the invention, the posts are connected to the connection elements by means of the receiving areas, but the connection elements, or their receiving areas, are not arranged at the ends of the posts, but between the ends of the posts. Parts of the posts can therefore protrude outwards from the framework according to the invention in the longitudinal direction of the posts. The protruding parts of the posts can be used in a variety of ways, for example to fix attachments such as floats or lifting devices, in extension of the posts.

In this way, a framework according to the invention can be held in shape or held together simply by means of attaching the posts to the bars provided with connection elements, preferably without tools, and by means of inserting (divisible) bands into bushings or by means of inserting framework struts into rotatable pins with transverse boreholes arranged on the connection elements, solely by means of the tensioning devices provided on the bands. As a result, minimal use of auxiliary resources is required to construct a framework according to the invention. According to the invention, the first bars are buoyant or function as floating bodies. In doing so, they generate a buoyancy force that reduces, balances or even exceeds the force of their own weight in water. In a preferred embodiment, the buoyancy force of the first bar is so high that a framework can be kept floating on a water surface, whereby in other embodiments the buoyancy force of the first bar is lower and additional floating bodies can be arranged on the framework in extension of the posts, for example.

Preferably, therefore, the framework according to the invention can be constructed as a unit, for example on land, and can be taken to form a framework structure on land or offshore, or can be taken offshore to extend a load-bearing frame structure. In another embodiment, an offshore load-bearing frame structure module can be assembled on land or near the shore from several frameworks according to the invention and brought to its place of use, for example by means of a tugboat, where it can be connected to further offshore framework structure modules. See below for further details.

The buoyancy of a framework according to the invention can be ensured, as indicated above, by configuration of the first bars as hollow bodies which are sealed in a fluid-tight manner with the connection elements, or which are configured as fluid-tight hollow bodies which can be attached to the connection elements according to the invention. The inventive concept encompasses the fact that, in addition to the first bar, the second bar and/or the posts also have a circular cross-section and/or are configured as hollow bodies. Additional buoyancy bodies can be attached to the first or second bars or the posts temporarily or permanently, for example to increase the buoyancy of the frameworks according to the invention.

If the second bar and/or the posts have a fluid-tight cavity or are closed in a fluid-tight manner by the connection elements, the second bar and/or the posts can act as a floating body in addition to the first bar and contribute to the buoyancy of the framework according to the invention.

In the framework according to the invention, the first and second bars can exhibit different cross-sections or diameters, or be made of different materials, since the second bars frequently do not have to contribute to the buoyancy force, though this is conceivable. This is particularly true in applications where the frameworks according to the invention are aligned vertically in a load-bearing structure, with the first bars forming the lower bars, for example. In this case, the first bars floating on or just below the water surface are the key factors in generating a buoyancy force. It is therefore conceivable to make the diameter of a first bar much larger than the diameter of the other second bar in order to save weight, for example. For reasons of economy, however, it is also conceivable to design the two bars as identical parts, since the connection elements, four of which are installed in each framework, can then also be configured as identical parts without the need for adapter pieces. It may then be necessary to position additional floating bodies in the extension of the posts or on the bars in order to generate sufficiently high buoyancy forces. Also, the use of the same materials for both bars is not necessary according to the invention, so that, for example, the first bar generating a buoyancy force can be made of a plastic or plastic composite material, for example, whereas the other parallel (upper) second bar can be made of a metallic material and exhibit a cross-sectional shape of a double T-beam, for example, and be further made of seawater-resistant aluminium, for example.

In principle, it is possible to use any material that can customarily be used to generate a buoyancy force such as hollow bodies and materials with a density lower than that of water, especially salt water. Foamed materials can also be considered here, surrounding a solid core of the bar, for example, which is necessary for reasons of strength, for example.

In this case, the bars, the posts, the connection elements, parts of the connection elements, and/or the bands can be made of a metallic material, of a plastic, of a non-bending elastic material or of a composite material, whereby each component should be formed from the material that best meets the requirements for the component.

In order to further increase the buoyancy force, in another embodiment according to the invention a floating body can be attached to the frameworks, for example in extension of the posts which space the two bars parallel to each other. Floating bodies can also be mounted parallel to the plane of the framework, however, if the framework is to be arranged parallel to the water surface, for example. Regardless of the position of the framework according to the invention, the floating bodies can therefore be arranged between the framework and the water surface. However, fixing a floating body half way between the two connection elements is equally covered by the inventive concept, as is the arrangement of two or more floating bodies, also one above the other on the framework, which is preferably buoyant itself according to the invention.

In addition or alternatively to the floating bodies, parts of a mounting, for example for solar panels or wind turbines, or part of a holder for a platform or lifting devices may be arranged on the frameworks according to the invention. Depending on the installation position of the frameworks according to the invention, these attachments are either fixed parallel to the plane of the frameworks according to the invention or, for example, in extension of one of the posts.

In order for the frameworks according to the invention to be able to be joined to each other obliquely or transversely or also parallel to their surface extension or to be joined to form a three-dimensional structure, an extension is formed on one side of the connection elements and a holder is formed on the opposite side in such a way that the extension of a connection element of a first framework can be connected by means of the holder of another connection element of a further, second framework.

In a preferred embodiment, the connecting elements are asymmetrical in design and can therefore be formed at all corner points of the framework according to the invention, since two adjacent connection elements of two frameworks can always be connected to each other in a kind of male-female connection. This makes it particularly easy to connect two frameworks with a minimum number of components.

In addition to an asymmetrical construction of the connection elements, the inventive concept also encompasses the fact that the connection elements are formed symmetrically, i.e. that the extension and the holder of the connection elements are designed to be substantially the same. In the case of symmetrical connection elements, for example, an adapter part is provided according to the invention which forms a male-female connection with the holder of one connection element and at the same time engages with the extension of another connection element, likewise in a male-female manner. All in all, therefore, a symmetrically constructed connection element whose extension or whose holder is extended by an adapter part according to the invention can also be regarded as an asymmetrical connection element which engages with a further connection element, the latter being mirror-inversed with respect to the adapter part.

One embodiment of the invention exhibits extensions on the connection elements into which a connecting eye is inserted, into which in turn a connecting pin can be inserted. In order to secure such a connecting pin, screw points for holders are provided on the side of the connection element opposite the connecting eye which can fix the respective connecting pins in the connecting eye of an adjacent connection element in the axial direction and in certain embodiments additionally in the radial direction. According to the invention, therefore, it is possible to use identical parts for the connection elements both to hold together the framework according to the invention per se and also to join several frameworks according to the invention to each other via these connection elements. The exact configuration of the connecting eye, if necessary with reinforcing sockets, as well as the exact configuration of the connecting pins, which preferably exhibit conical ends, and the holding elements for receiving and locking the connecting pins are technically unlimited. A specific embodiment is described in more detail below with reference to the attached figures.

In a preferred embodiment of the invention, a lift-to-weight ratio of at least the first bar is variable. For example, flooding means can be provided by means of which the first bar can be filled with water or emptied of water. Additionally or alternatively, weighting means may be used which can be (dismountably) attached to the first bar and which increase or decrease the weight and/or buoyancy of the first bar. In this embodiment of the framework according to the invention, the second bar is preferably also buoyant.

According to the invention, either the first bar formed as a hollow body or at least one of the connection elements arranged on the bar can have an opening through which the first bar can be filled with water or emptied of water. A person skilled in the art will choose the position of the opening to suit the application. For example, it may be preferable to arrange the opening at the lowest point of the hollow body to be emptied, as this makes it particularly easy to remove all the water from the hollow body with the aid of the water's own weight. In this case, it may be necessary to provide a snorkel-like or hose-like device at the opening by means of which access to the opening from the water surface is made possible. Preferably, the opening can be closed in a watertight manner, for example by a plug that can be inserted or screwed into the opening. Other methods or devices known to the person skilled in the art for closing the opening in a fluid-tight manner, such as welding on a sealing cap, gluing or inserting or applying curable sealants, are encompassed by the inventive concept.

Furthermore, several openings can also be arranged on the bars if this is necessary for the flooding or emptying process. For example, it is possible to provide an opening on the top side and an opening at the bottom side of a bar. Water, for example, can enter or be pumped into the bar through the opening at the bottom, whereby the air displaced by the water can escape through the opening at the top. In the opposite case, for example, air can flow into the bar via the top opening when water is sucked out of the bar through the bottom opening. A person skilled in the art will of course select the number and arrangement of the openings as well as the means and tools used for flooding and emptying in a way that is adapted to the application. For example, another gas can be used instead of air, or another liquid instead of (sea) water. The use of entirely different materials, such as curable foams, is also encompassed by the inventive concept.

In one embodiment of the invention, for example, if both bars, i.e. the first bar and the second bar are buoyant, the frameworks according to the invention can also be used floating flat on a body of water to be deployed as a kind of pontoon, floating frame or floating truss for buoyant platforms.

A number of frameworks according to the invention can be used, for example, to construct a chessboard-like offshore framework structure floating flat on the water surface. For this purpose, several frameworks are arranged floating on the water surface, i.e. aligned parallel to the water surface, and connected by means of the connection elements arranged in the corners of the frameworks. This creates a chessboard-like structure extending along the water surface, in which frameworks and "free" spaces are arranged alternately. In a further embodiment, both the bars and the posts of a framework according to the invention are designed to be buoyant. However, it is also possible for not all elements of the framework according to the invention to be buoyant, depending on how much buoyancy needs to be generated by the framework.

Further preferably, bands provided with tensioning devices are tensioned in the free, empty spaces of the chessboard-like offshore framework structure between the connection elements arranged in diagonally opposite corners. The bands according to the invention are similar or identical in construction to the bands used for diagonal tensioning of a framework according to the invention. This means that, for example, the tensioning devices or the ends of the bands can be designed in a variety of customary ways. By tensioning the empty spaces diagonally with bands, the stability of these (free) spaces and therefore the stability and resistance of the entire planar structure against externally applied deformations, such as waves, is increased.

The connection elements or adapter pieces or parts of the connection elements by means of which the frameworks of the chessboard-like offshore framework structure are held together may be designed to be elastically deformable, i.e. to exhibit an elastic material response under the impact of the forces normally occurring during operation of the offshore framework structure.

If two adjacent frameworks perform a relative movement to each other, for example because a wave slops under the offshore framework structure, this relative movement can be compensated for by an elastic deformation of the material of the connection elements without causing a plastic deformation of the components of the offshore framework structure, still less a material failure. In certain applications, it may be sufficient or even necessary to design only parts of the connection elements, e.g. the holders, to be elastically deformable. A variety of elastically deformable materials or material combinations, for example elastomers, plastics or fibre-reinforced plastics, can be selected. As already explained above, the specification "elastically deformable" must always be assessed in the light of the forces impacting during operation of the framework structure.

As indicated above, the frameworks according to the invention, which can be buoyant on their own if necessary, can also, alternatively to the previously mentioned, two-dimensional, carpetlike, more two-dimensional structure, be assembled to form a buoyant three-dimensional offshore framework structure module in the form of a straight triangular prism or a straight quadrangular or polygonal prism by means of suitable connection elements. A characteristic feature of such straight prisms is their congruent base and top surfaces. According to the invention, the frameworks described above form the side surfaces of such framework structure modules according to the invention as basic units, which in turn serve as units for offshore framework structures according to the invention.

According to the invention, the preference is for the frameworks in the offshore framework structure modules according to the invention to be oriented in perpendicular fashion, i.e. vertically to a water surface, with the first bars floating in or on the water. These framework structure modules, which in particular form modular base bodies for planar three-dimensional framework structures, for example for the construction of a large-area offshore framework structure, can be assembled both on land and at sea. Since the frameworks are inherently rigid and tensioned, they are easier to transport, assemble and manipulate than their individual parts themselves. This also applies in particular when the frameworks are to be joined together in swell.

One framework structure formed from three frameworks according to the invention constitutes the smallest framework structure module, a straight triangular prism. The first bars span an approximately triangular base surface, while the second bars span a congruent triangular top surface. Since the three frameworks according to the invention in this case are arranged vertically, the side edges of such a triangular prism are formed by two lateral rods (posts) of two adjacent frameworks. The frameworks are connected via the connection elements. Specifically— as set out above— for example via extensions formed on the connection elements with connecting eyes, in which connecting pins can be inserted, the pins being held by holders which can be screwed onto the adjacent connection element, for example. Due to the straight triangular prism structure, such a module is inherently stable and does not require any tensioning in the respective base or top surface, although this is conceivable.

If four frameworks according to the invention are joined to each other, each standing vertically, the result is a substantially cuboid structure, whereby the vertical side edges are formed from two lateral rods/posts of adjacent frameworks in each case. Here, the first bars and the second bars each form a substantially rectangular base or top surface. Here, too, adjacent frameworks are joined to each other by means of the connection elements as described above.

In addition, the connecting pins of the individual connection elements can exhibit transverse boreholes into which connectors provided with tensioning devices can be inserted in order to clamp the framework structure modules together, for example at the base surface as well as at the top surface. If the transverse boreholes are designed as diagonal boreholes, connectors can also be joined in the space diagonal, i.e. from a connection point in the base surface to a connection point in the top surface which is not part of the same framework. Here again, the connecting pins are preferably mounted rotatably in the connection elements so that the three-dimensional offshore framework structure module constructed from preferably scalable frameworks is also scalable.

In the case that a framework structure in the shape of a polygonal prism is constructed from the frameworks according to the invention, a centre element constructed from connection elements can be arranged at the centre of the base or top surface or of the spatial volume. The centre element is connected via connectors to the connection elements arranged in the corners of the base and/or top surface. This has the advantage that a multitude of connection elements can be connected to the one centre element via connectors, which results in a particularly good stiffening of the framework structure according to the invention and allows the frameworks to be flexibly arranged, e.g. in a kind of star shape.

If frameworks according to the invention are connected according to the invention, straight triangular prisms or straight quadrangular prisms or straight polygonal or star-shaped prisms are created which can form an offshore framework structure module of an extensively planar load-bearing frame structure. These three-dimensional triangular, cuboid or polygonal structures can then be used to build individually designed load-bearing frame structures, depending on the application, which can be platforms or bracing/support devices for renewable energies or maintenance platforms or also for wind turbines or drilling platforms. Of course, the frameworks according to the invention are also conceivable for use in load-bearing structures for leisure bathing platforms or as equipment platforms or break platforms for diving. The field of application of offshore load-bearing frame structures according to the invention is not limited to these possibilities however, so floating bridges and the like are also conceivable.

Should the inherent buoyancy of the offshore load-bearing frame structures formed from frameworks according to the invention not be sufficient for the respective application, floating bodies can additionally be attached on, above or below the first bars provided for buoyancy. For this purpose, it is conceivable, for example, to arrange corresponding receiving devices for retaining rods or retaining eyes for floating bodies in extension of the posts with which the framework structures can be supported at the respective connection points/nodes. In a preferred embodiment, four floating bodies can be arranged in this way at the respective four corners of the rectangular base surface on a cuboid framework structure, for example, although a larger number of floating bodies, for example divisible by four, is also within the realm of possibility. The devices can of course also be installed on one or more of the bars.

Similarly, retaining rods can also be attached to the upper nodes or corner points of the framework structure modules in order to attach further structural elements for a holding device to them. Such holding devices, hereinafter also referred to as attachment holding devices, can be used, for example, to fix attachments such as solar panels, masts, wind turbines, cranes or comparable attachments which are installed on the floating offshore framework structure.

According to the invention, one or more support structures may be arranged in a top surface spanned by the second bars and/or in a bottom surface spanned by the first bars and/or in an intermediate plane between the top and bottom surfaces. In this case, the support structures are supported on opposite first bars or second bars and/or connectors in such a way that superstructures such as platforms, photovoltaic modules or the like can be supported on the support structures. In this way, the support structures enable the area or the region between the bars to be utilized. A customary design of the support structures, for example in the form of cross beams adapted to the distribution of the load to be supported, which are placed on the bars and attached there, is included in the inventive concept.

The support structures can also have rail-like tracks on which carriage-like or basket-like means of transport can be moved between the bars of the framework structure. Preferably, such a construction is used in the top surface of the framework structure according to the invention, for example between the second bars, in order to enable the movement of persons or the transport of tools in the top surface of the framework structure.

In one embodiment of the framework structure according to the invention, the closed, fluid-tight cavities of the first and/or second bars can be connected to each other via hoses joined to openings in the bars and/or in the connection elements in such a way that a fluid conduit system is formed. By means of a pumping or suction device, cooling liquid, for example, can subsequently be pumped through the conduit system consisting of bars and hoses. Such a cooling fluid circuit can be used, for example, to absorb the waste heat from electronic components, photovoltaic modules or other components that require cooling, which are arranged in or on the framework structure, and to dissipate or discharge it to the water, at least via the first bars floating in or on the water, which acts as a heat sink. Measures to improve heat transfer, such as the use of an additional heat exchanger to increase the transfer area, fall within the skill of the art.

The framework structure according to the invention can also be used to configure a wave power plant, as indicated above, by forming a planar load-bearing structure composed of a plurality of framework structures. At the respective side edges of the offshore framework structure modules, floating bodies can then be movably mounted in such a way that they are able to follow the passage of the waves through the load-bearing structure/wave power plant in a vertical direction. This means that the individual floating bodies are arranged in movable lifting rods which are aligned parallel to the posts and move vertically up and down in an oscillating motion, depending on whether they are currently on a wave crest or in a wave trough. The lifting rod attached to these floating bodies transmits this oscillating vertical movement to linear generators, for example. The drive shafts of these generators are set in rotation by the oscillating movements and can generate electrical energy according to the principle of a dynamo, which is accumulated, rectified and potentially stored temporarily and transmitted to land via suitable means.

In a simplified embodiment shown of a framework structure in the form of a straight triangular prism, for example, three movably arranged floating bodies can perform such an up and down movement in this way. Scaled up in a modular manner, it is therefore readily comprehensible that a structure which is planar in configuration comprising a hundred or more such triangular framework structure modules can provide a plurality of movable floating bodies for energy conversion, thereby forming a wave power plant.

If one imagines a cuboid surface structure with an edge length of one hundred metres or more, which is made up of frameworks according to the invention with a bar length of, for example, 10 m— for example 10×10 cuboid framework structure modules— it can be readily comprehended that such an offshore load-bearing structure in planar configuration floats relatively stably on a surface of a body of water while a wave passes through such an extended load-bearing structure. It is also conceivable that the weight of the extensively planar load-bearing structure is balanced in such a way that, on the one hand, it has a high inertia against deflection by the waves and, on the other hand, it provides sufficient inherent buoyancy so that the movably arranged floating bodies are deflected purely by the force of the waves and do not have to exert any buoyancy force to hold the load-bearing structure.

According to the invention, a method for connecting at least two frameworks comprises the following steps:

In a first step a), the frameworks according to the invention are arranged floating flat on the surface of a body of water, the depth of which corresponds at least to the distance between the first bar and the respective second bars. Both the first bars and the second bars are designed to be buoyant, which is why the framework floats on the water surface and is aligned parallel to it.

In a next step b), the buoyancy-to-weight ratio of the first bars is reduced to such an extent that the first bars can submerge below the water surface and the frameworks are kept floating on the water surface with the second bar. Here, the buoyancy-to-weight ratio is the quotient of buoyancy and weight force. It therefore relates the buoyancy provided by the first bars to the weight of the first bars. A high buoyancy-to-weight ratio results in the first bar providing significantly more buoyancy than it would need by its own weight to float on a water surface. With a buoyancy-to-weight ratio of 1, the first bar provides exactly as much buoyancy as it needs to balance its own weight and therefore float on a water surface. If the buoyancy-to-weight ratio is less than 1, the first bar will sink. The buoyancy-to-weight ratio of the first bars is reduced in step b) to such an extent that the frameworks according to the invention are buoyant when aligned substantially vertically to the water surface, with the second bars continuing to float at or on the water surface. This step b) is carried out for all frameworks to be connected so that the frameworks all float in the water in the same alignment, namely substantially vertically to the water surface.

In a further step c), connection elements arranged on the second bars of each of two frameworks to be connected are joined to each other in such a way that a first node is created at the upper end of the posts at the water surface, and via which the two frameworks are fixed to each other.

Since this state after step c), in particular the position of the two frameworks in relation to each other, is only determined by the fixation at the first node, in a subsequent step d) stabilizing devices are attached to the connected frameworks so that the adjacent posts of the two frameworks are kept substantially parallel to each other. This prevents the two frameworks, or the two adjacent posts of the frameworks, from changing their relative position to each other or drifting apart in the further course of the method, which could, for example, lead to damage to the connection elements that form the first node.

After the position of the frameworks to be connected to each other has been locked, in a subsequent step e), the buoyancy-to-weight ratio of the first bars is increased so that the frameworks rise while maintaining their orientation to each other until the first bars float just below, at or on the surface of the water. In this case, the frameworks to be connected are still aligned substantially vertically to the water surface, whereby at least the relative position of the two adjacent posts is stabilized.

In a final step f), the connection elements arranged on the adjacent first bars are now connected to each other. This produces a second node at the bottom of the posts where the two frameworks are held together.

The result of the method according to the invention is therefore an offshore framework structure of angular shape from the top view, consisting of two frameworks, which can now be connected to an already existing offshore framework structure according to the invention or can provide the foundation for the construction of an offshore framework structure according to the invention.

In order to reduce the lift-to-weight ratio of the first bars according to step b), according to the invention, weighting means can be dismountably attached to the first bars in such a way that they can be removed again. Alternatively, a hose or snorkel can be attached or used to introduce water into the first bar. As previously stated, the opening to which the hose is applied can be provided both in the first bar itself and in the connection element attached to the first bar.

According to the invention, both weighting means and a hose can be used if, for example, a particularly rapid change in the buoyancy-to-weight ratio is desired. In order to increase the buoyancy-to-weight ratio of the first bar, either the weighting means are removed and/or buoyancy means are attached and/or, using for example a compressed air unit or using a pump, the water is removed from the bar again; for example, blown out, pumped or sucked, and air or another gas is introduced into the bar. A person skilled in the art is familiar with a variety of possible solutions to remove the water contained in the first bars or to replace it with air or gas. When implementing the solution according to the invention, care must be taken to ensure that the weighting means or the hose are still accessible when the first bar is arranged below the water surface, for example because the buoyancy-to-weight ratio of the first bar has been changed as part of the assembly of a framework structure according to the invention and the first bar has been lowered below the water surface.

According to the invention, more than two frameworks floating vertically in the water can also be combined to form a framework structure whose second bars float on the water surface and whose first bars have been lowered below the water surface before steps e) and f) are carried out. A person skilled in the art will choose the number of frameworks to be joined in steps d) and e) depending, for example, on how the change in the buoyancy-to-weight ratio of the first bars is carried out and depending on the desired size of the offshore framework structure to be formed.

During assembly, according to one of the steps b) to f), fixing means can be fitted between each two frameworks in such a way that a predetermined angle between two frameworks, viewed from above, remains constant. This predetermined angle, which is preferably L-shaped from the top view, i.e. essentially right-angled, when building a structure with a rectangular base, is not defined by connecting the nodes alone as long as the frameworks to be connected do not form a contour that is closed in the top view, for example a triangle or a polygon. Preferably, these nodes allow a degree of freedom of rotation around an axis parallel to the posts of the frameworks. During assembly, it may therefore be preferable to keep the angle between two frameworks constant, as this then facilitates, for example, the joining together of several frameworks or framework structure subordinate units according to the invention. The fixing means can be designed as additional components to the stabilizing devices fitted in step d), but can also form a functional unit with the stabilizing devices as one component. There are no limits to the use of customary solutions.

According to the invention, the stabilizing devices attached in step d) are preferably attached to the posts of the two frameworks in such a way that they can be moved in the longitudinal direction of the posts. In this way, it is possible to attach the stabilizing device to the posts when the second bars are already floating at or on the water surface. The stabilizing device can then descend along the posts towards the bottom of the water, for example, reducing the leverage forces that the stabilizing device must provide to maintain the tilt angle between the two frameworks. In another embodiment, the stabilizing device may slide or be guided along the posts during the ascent of the frameworks according to step e).

Insofar as attachment holding devices are provided for fastening attachment parts such as floating bodies, photovoltaic modules, wind turbines or platforms to the posts and/or the first bars, these are preferably mounted above or below the first bars and/or on connection elements located at the ends of the first bars according to one of the steps b) to f). In a preferred embodiment of the method, the frameworks connected together according to step f) are moved into shallower water prior to the assembly of the attachment holding device, so that the attachment holding devices can be at least partially assembled by one or more assemblers standing on the ground. Furthermore, the buoyancy-to-weight ratio of the frameworks and therefore the height at which the frameworks float above the water can be altered so that the attachments and attachment holding devices can be mounted at a convenient working height.

Preferably, after increasing the buoyancy-to-weight ratio in step e), the hose—if one has been used—is removed and the first bars, or the connection elements, or the corresponding openings, are sealed in a watertight manner.

The frameworks according to the invention connected in this way, having been connected to each other at the level of the first bars and at the level of the second bars, can be connected in a floating state to previously connected frameworks, or added to a floating offshore framework structure or similar devices.

Insofar as rod-shaped components for assembly groups, such as lifting rods, masts, cranes or the like are to be integrated in the offshore framework structure constructed according to the invention, these can be moved in a simple manner with one end from below the water surface by means of a pulling device through the area spanned between the connection elements along the posts into a substantially vertical position below the water surface and substantially parallel to the posts. For this purpose, it may be preferable to install a crane device, for example in the plane of the second bar, by means of which the rod-shaped components are then pulled upwards from below the water surface.

In order to increase the buoyancy of non-floating components, attachable and detachable flotation aids or raft devices can be used so that the components can be transported and/or assembled floating on or at the water surface.

In this way it may also be possible, when constructing a large coherent framework structure from a plurality of frameworks according to the invention, to convey components into the interior of the framework structure which are inaccessible for a large transport vessel or cannot be reached even by large cranes, by means of the flotation aids or the raft devices in order to integrate them on or into the framework structure at the place of use.

For this purpose, crane devices can further be attached to the top surface spanned by the second bars, by means of which flotation aids, raft devices, attachment holding devices and/or attachments can be lifted from the water surface onto the top surface or into an intermediate plane between the top surface and the water surface. In this way, a framework structure according to the invention can be erected with little effort piece by piece essentially floating in the body of water, since the components required for this purpose are brought to the assembly site with means of flotation aids and cranes in order to erect the framework structure in local proximity to its place of use and to install/fit the desired equipment.

Figure 2:
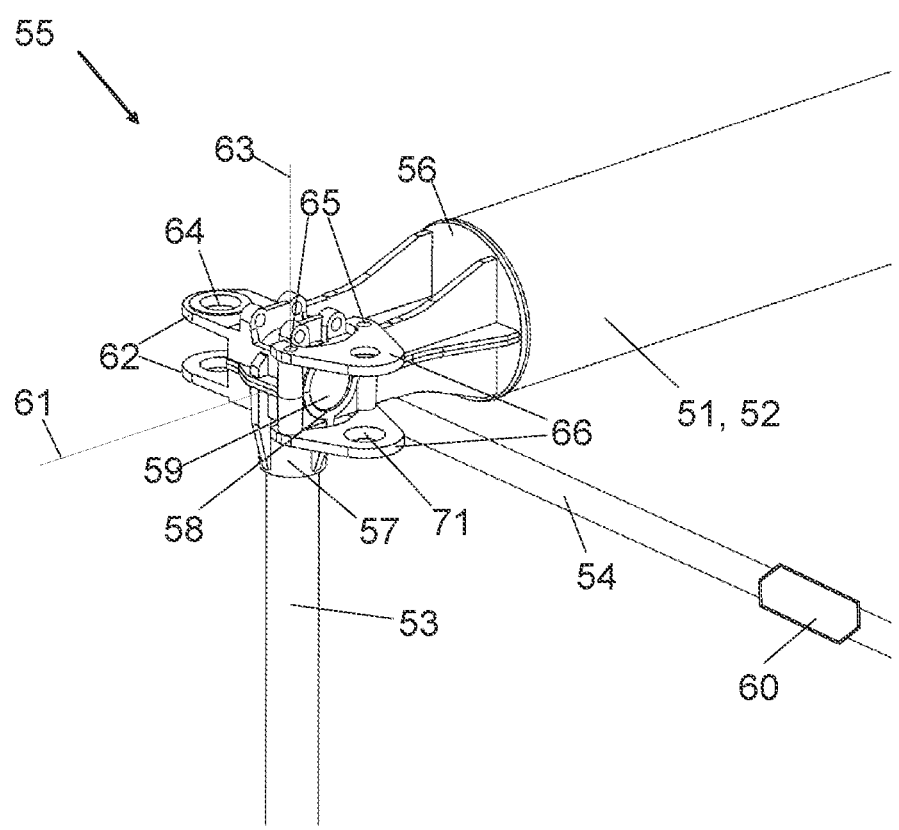
Figure 3:
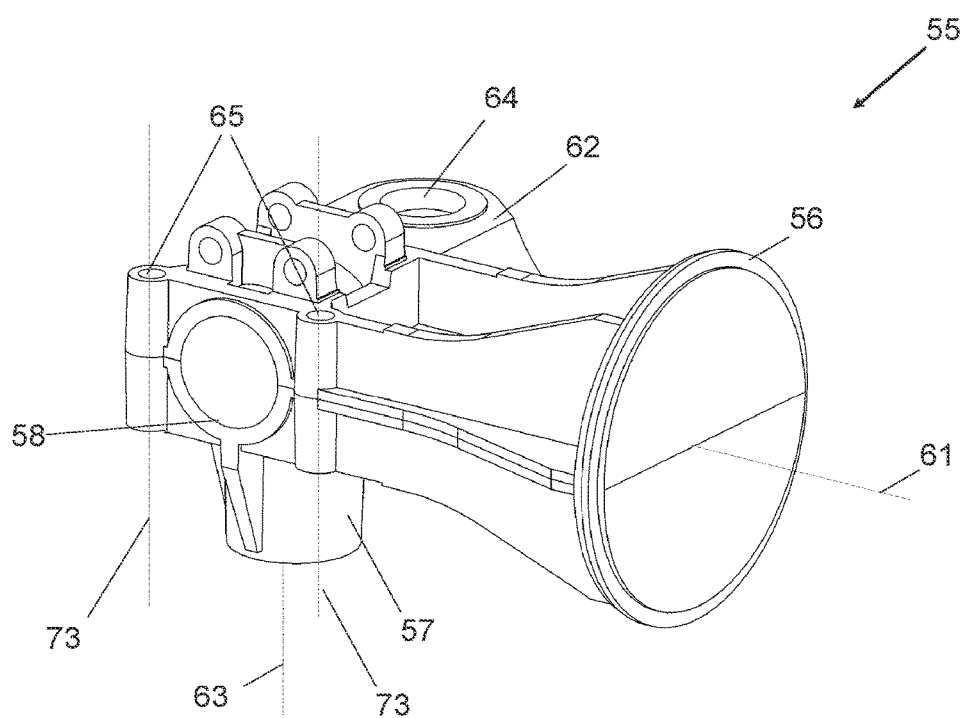
Figure 4:
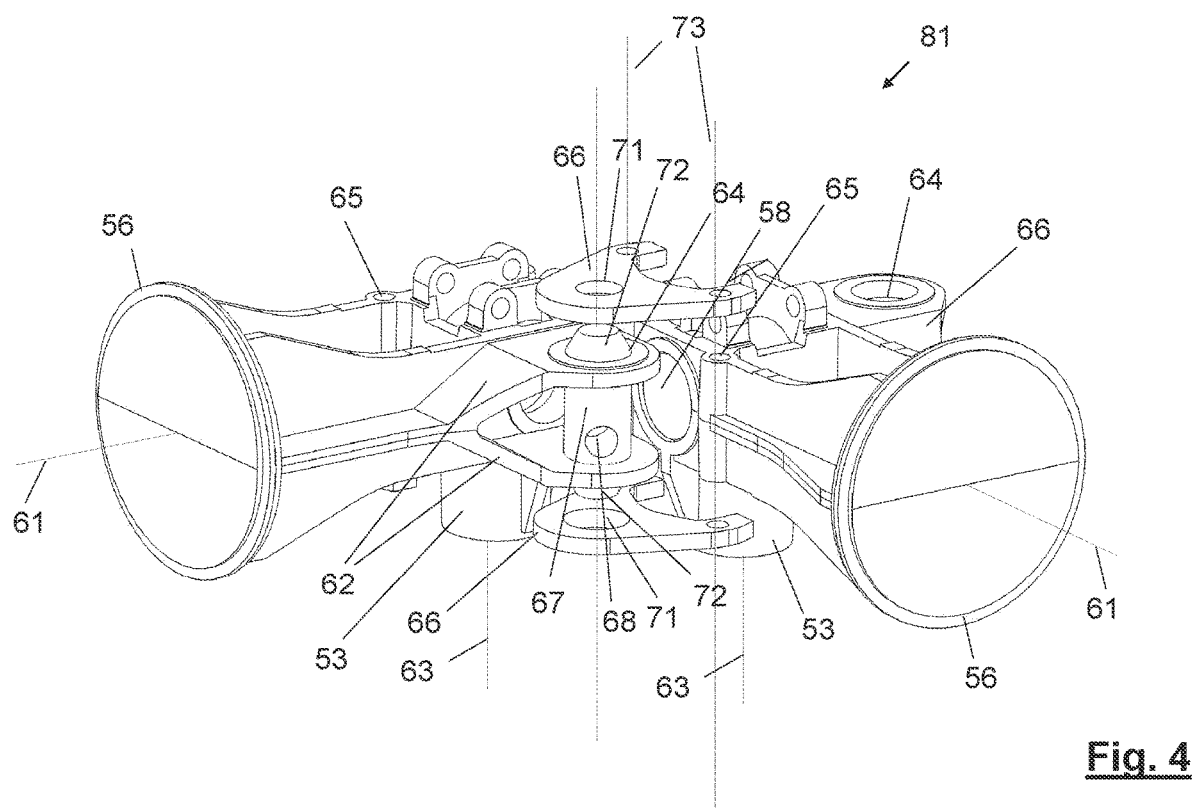
Figure 5:
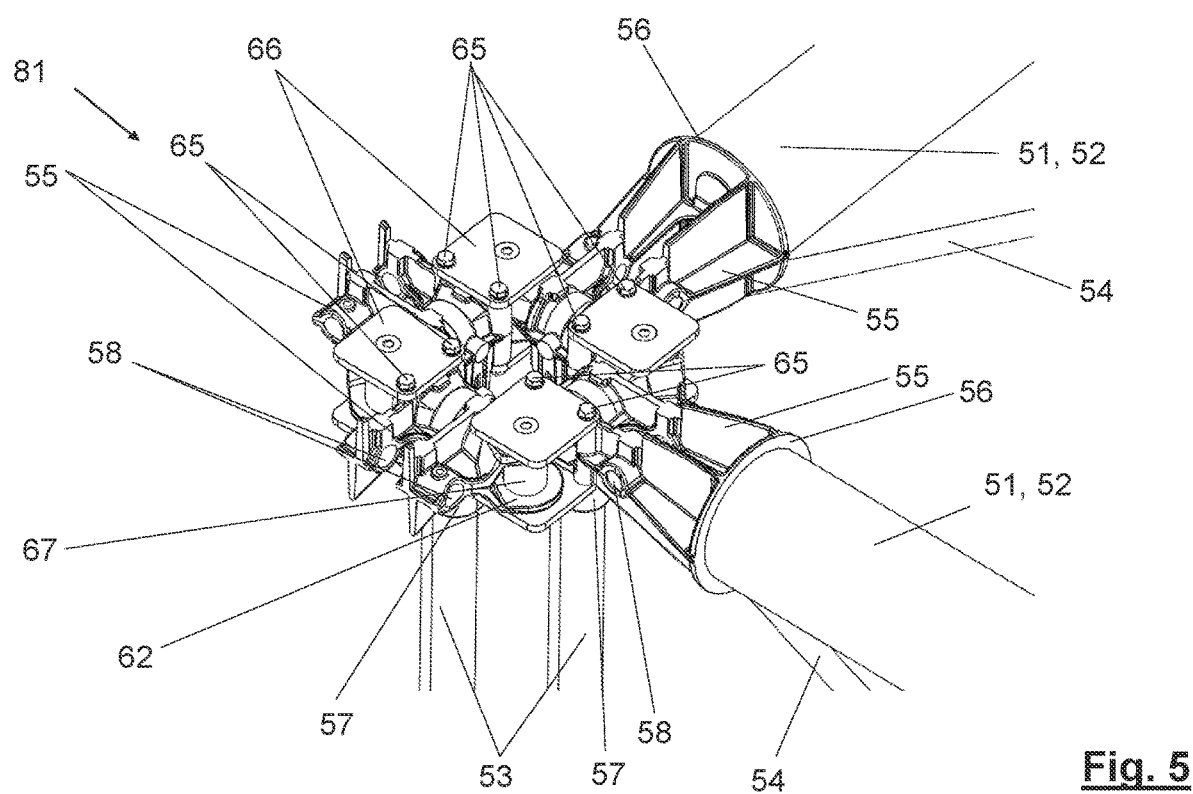
Figure 6:
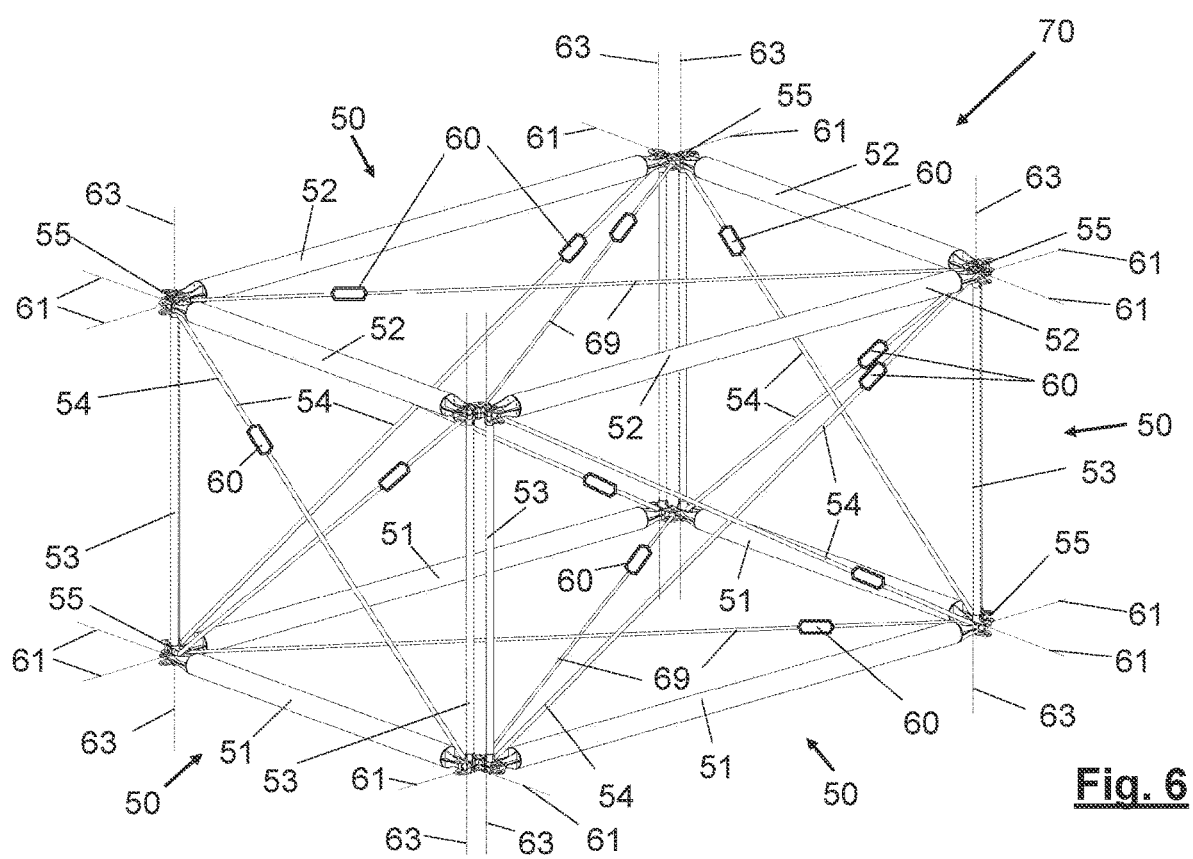
Figure 7:
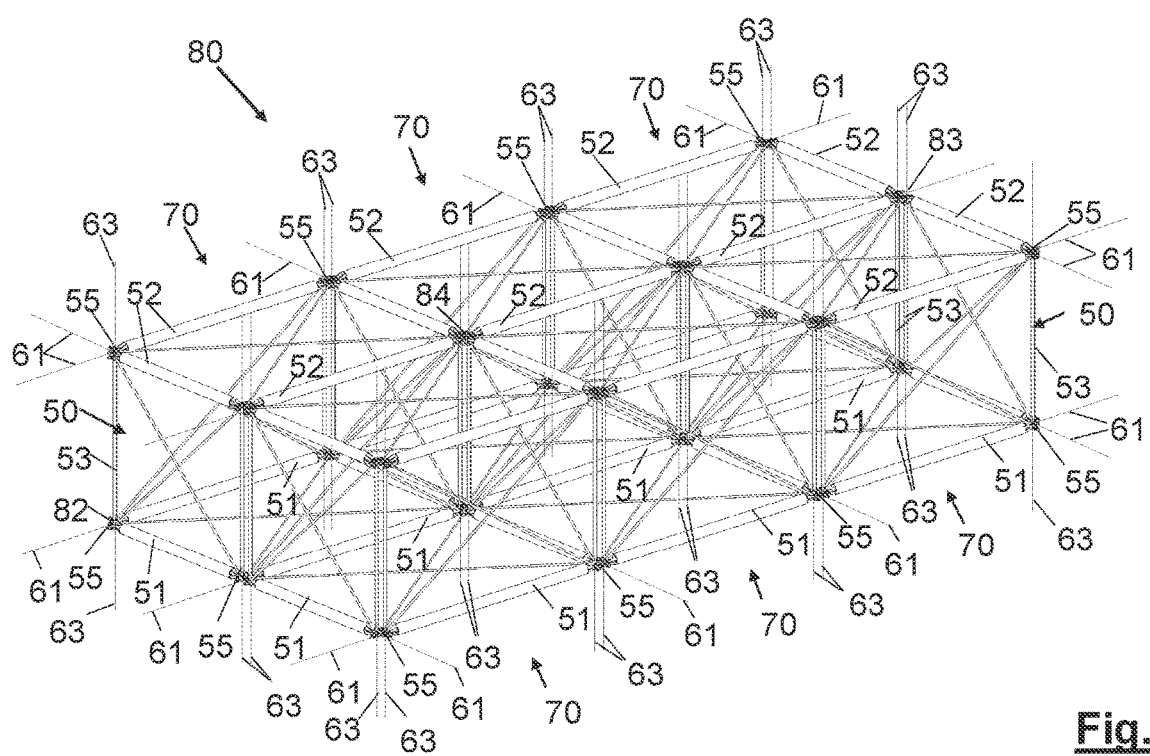
Figure 8:
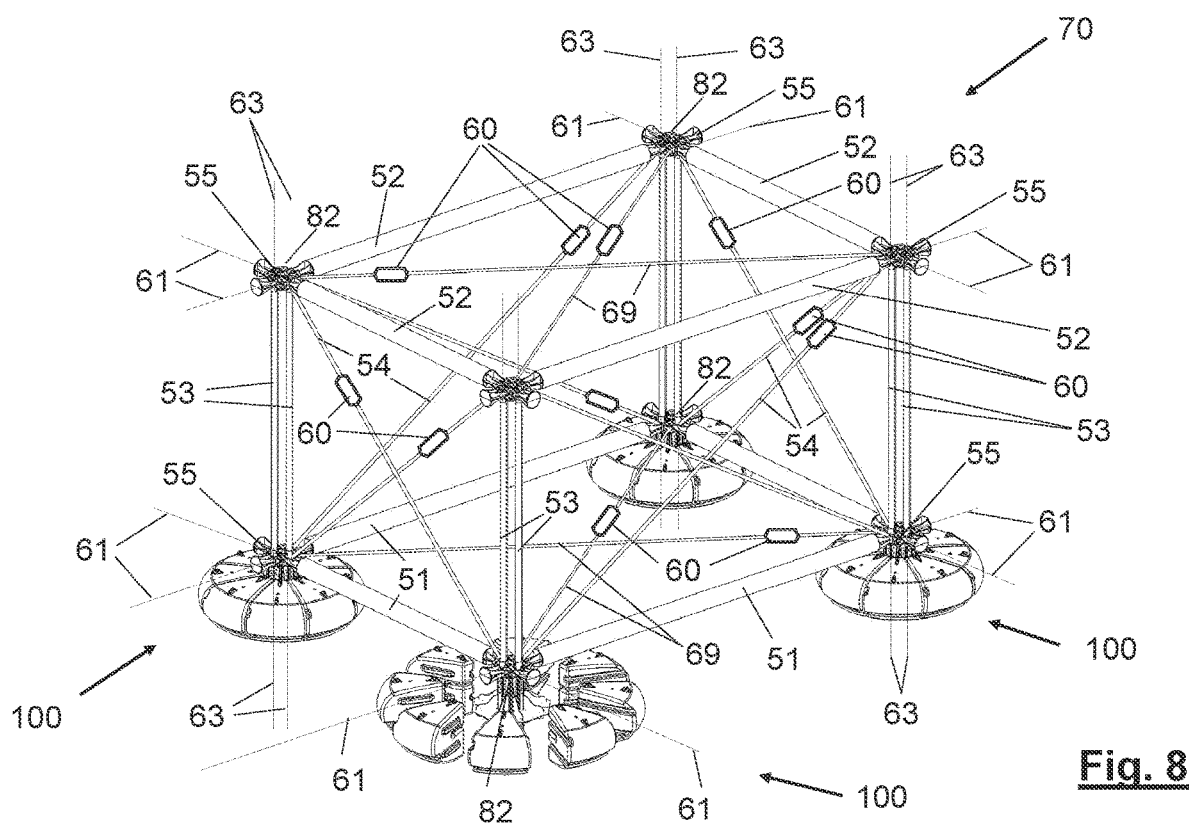
Figure 9:
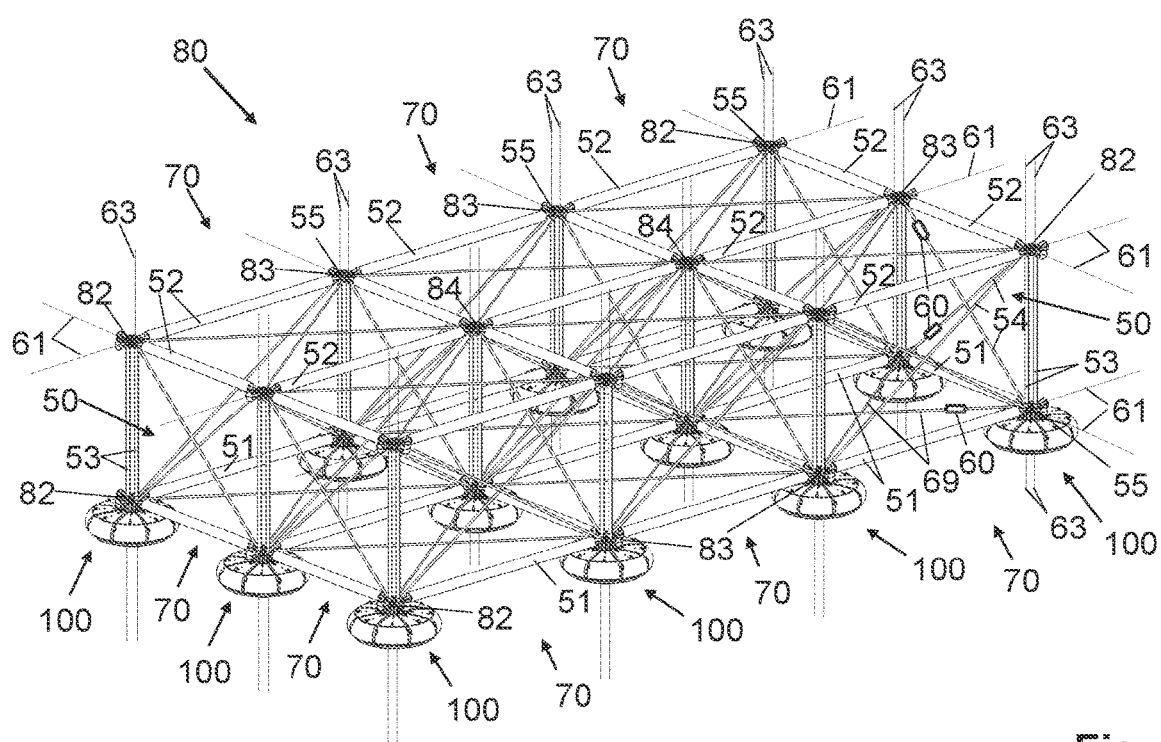
Figure 10:
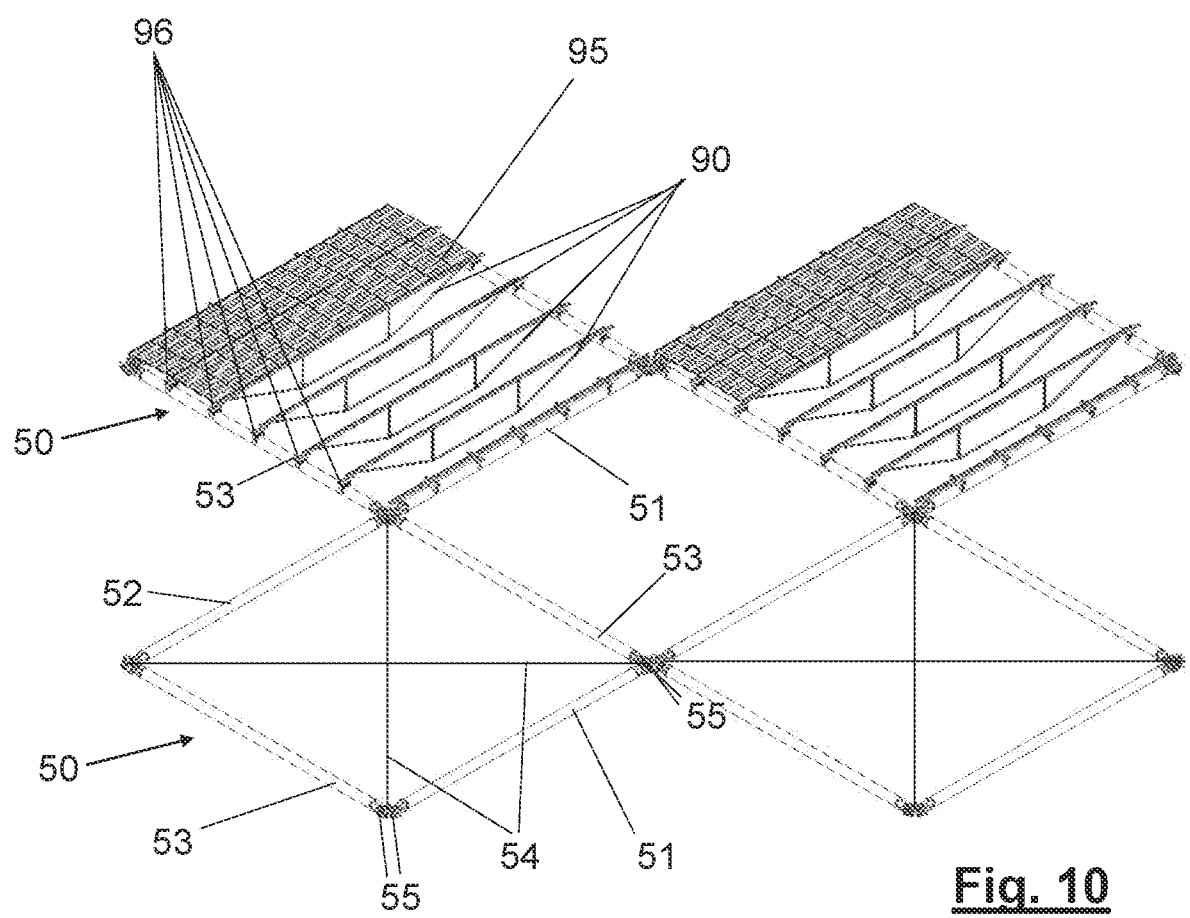
Figure 11:
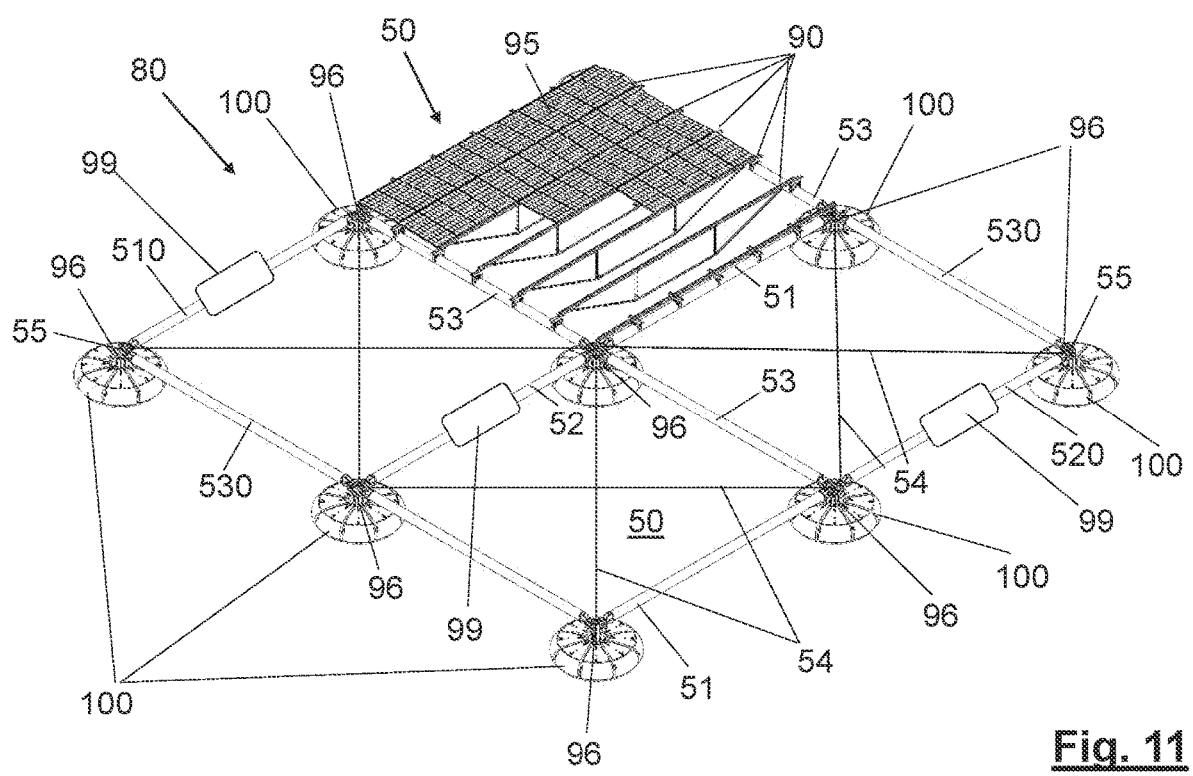
Figure 12:
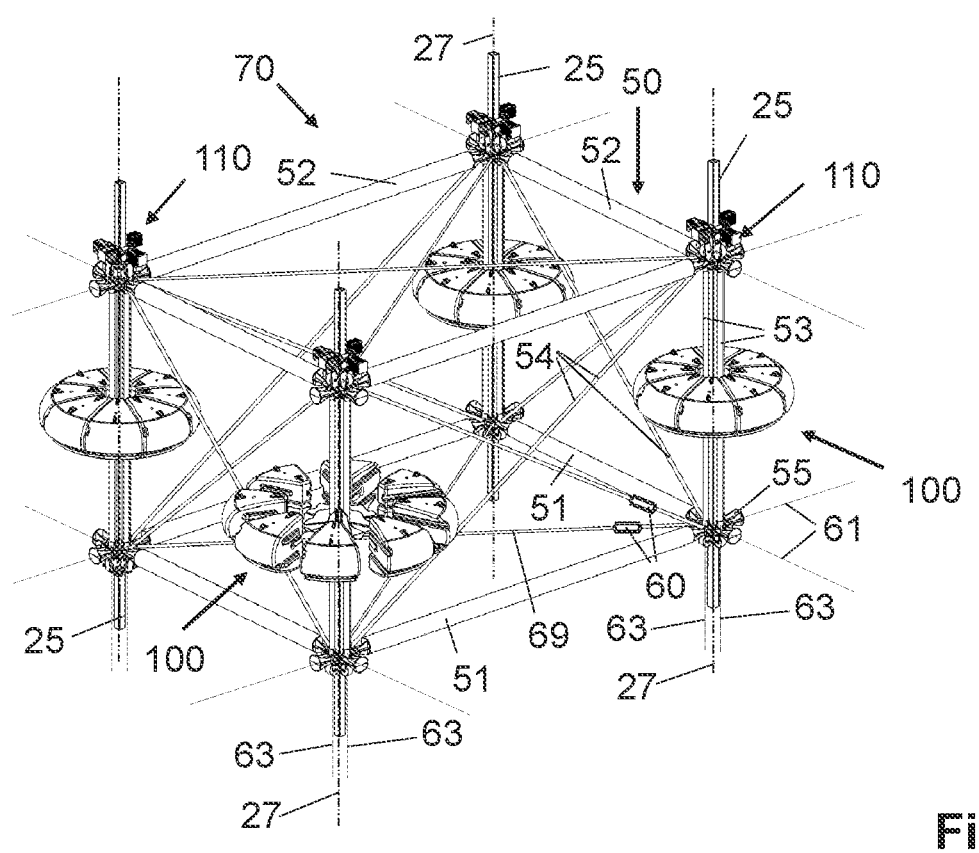
Figure 13:
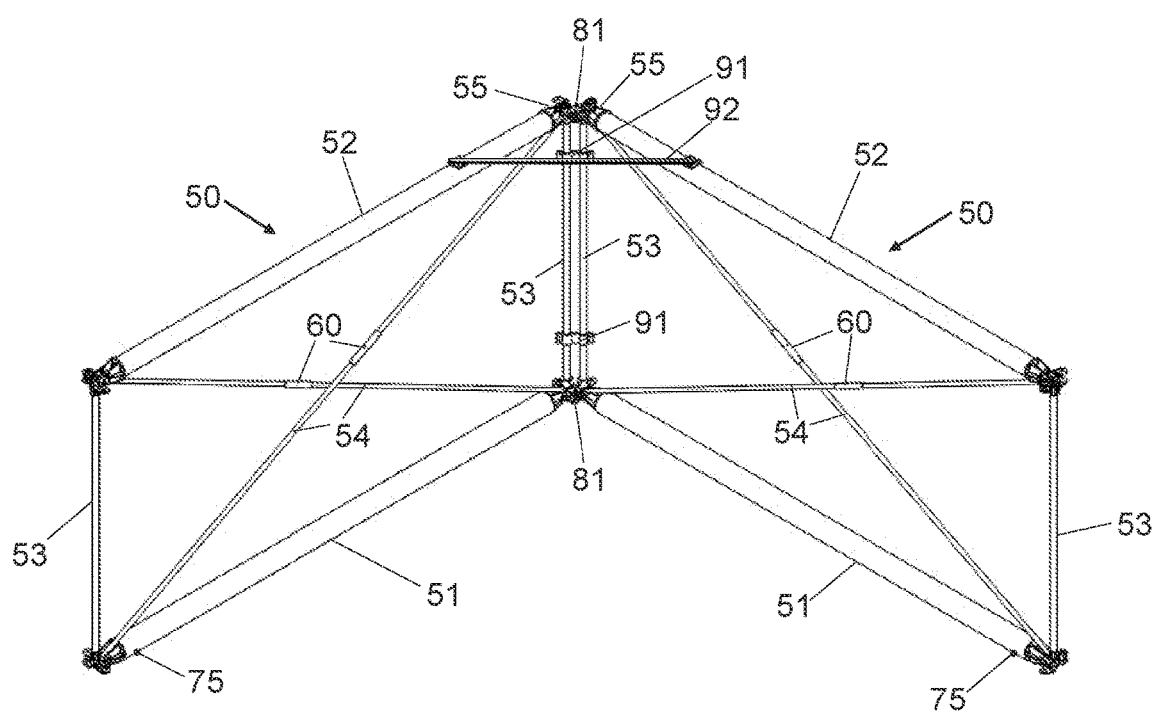
Figure 14:
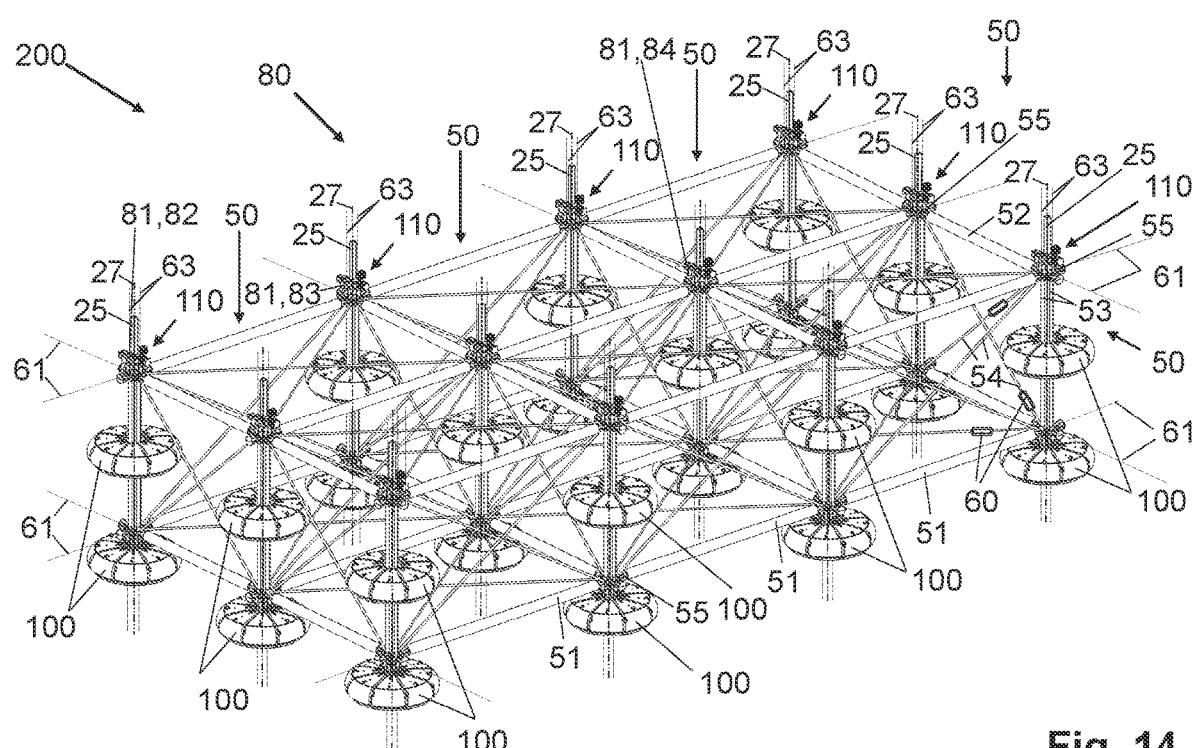

The framework according to the invention as well as the modular framework structures according to the invention and their assembly into load-bearing structures extended in planar fashion are illustrated below in figures based on preferred embodiments, whereby the figures or the embodiments shown therein do not restrict the inventive concept. The following are shown:

FIG. 1: A framework according to the invention;

FIG. 2: A perspective view of a connection element for the construction of a framework according to the invention;

FIG. 3: A connection element of a framework according to the invention;

FIG. 4: An embodiment for joining two connection elements of adjacent frameworks;

FIG. 5: An alternative embodiment for joining two connection elements of adjacent frameworks;

FIG. 6: A perspective view of a framework structure module according to the invention;

FIG. 7: A perspective view of a load-bearing structure consisting of a plurality of framework structure modules;

FIG. 8: A perspective view of a further embodiment of the modular framework structure according to the invention;

FIG. 9: A perspective view of an offshore load-bearing structure according to the invention with a plurality of framework structure modules according to the invention according to FIG. 8;

FIG. 10: A chessboard-like framework structure according to the invention;

FIG. 11: A second chessboard-like framework structure according to the invention;

FIG. 12: A framework structure module for a wave power plant;

FIG. 13: Two frameworks connected by a method according to the invention;

FIG. 14: A perspective view of a wave power plant composed of a plurality of framework structure modules.

Figure 15:
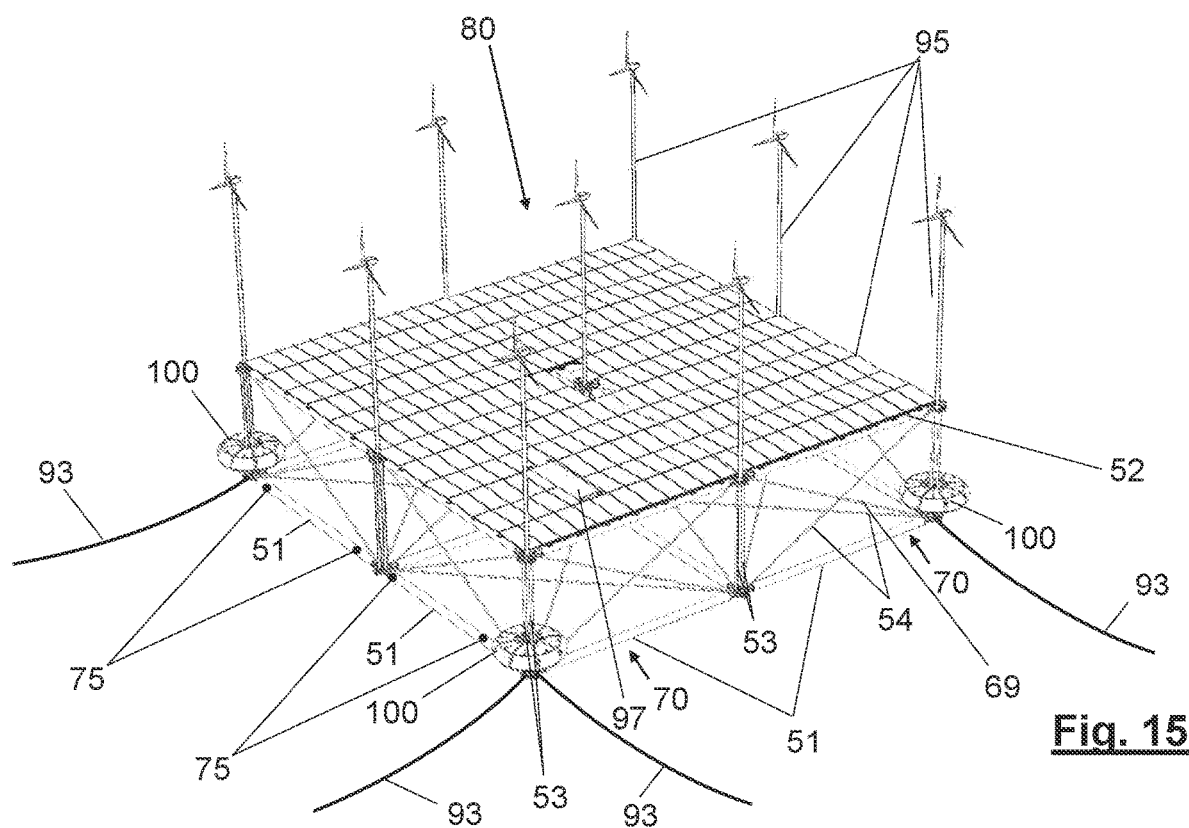

FIG. 15: An offshore load-bearing frame according to the invention composed of a plurality of framework structure modules according to the invention.

FIG. 1 shows a buoyant framework 50 according to the invention with a first bar 51 and a second bar 52 parallel to it with their respective longitudinal axes 61. The two bars 51 and 52 are held spaced apart by posts 53, which are mounted in connection elements 55. The longitudinal directions 63 of the posts 53 are vertical to the longitudinal direction 61 of the bars 51 and 52. Connection elements 55 are arranged at each end of the first bar 51 and the second bar 52, whereby the connection elements 55 are tensioned together by means of bands 54 which exhibit tensioning devices 60. This creates a stable framework 50, which is diagonally tensioned by means of the bands 54. The bands 54 are hooked into the connection elements 55, for example in such a way that they are locked in the direction of the centre of the framework. In a further preferred embodiment the bands 54 are mounted in rotatable pins 59 (see FIG. 2) with transverse boreholes in such a way that they are connected to the tensioning devices 60 and can tension the framework 50 diagonally.

The framework 50 shown in FIG. 1 exhibits approximately the same diameters for the two bars 51, 52, but this is not mandatory, as described above. The lateral posts 53 and the bands 54 can be, for example, tubes or solid bars made of a metallic material. However, if the framework 50 is intended for offshore use in the sea, a salt-water-resistant alloy should be chosen when selecting the material. This of course applies to the connection elements 55, too.

FIG. 2 shows a detailed view of a connection element 55 of the framework 50 according to the invention; here it can be seen that the posts 53 are mounted in receiving areas 57 of the connection elements 55 and the bars 51 and 52 are joined to the connection element 55 via flanges 56. Furthermore, a pin 59 can be seen which is inserted into a borehole 58 of the connection element 55 and which holds a framework strut 54 in the form of a band. On one side of the connection element 55, extensions 62 are shown with a connecting eye 64 formed inside, into which, for example, a connecting pin 67 (cf. FIG. 4) can be inserted. The connecting pin 67 is lockable by means of holders 66, (cf. FIG. 4) which can be attached to the connection element 55 at screw points 65 on the opposite side of the extensions 62.

FIG. 3 shows a connection element 55 as it is used, for example, four times per framework when assembling a single framework according to the invention. On the right-hand side, the flange 56 is shown for the possible fluid-tight attachment of the connection element 55 to one end of a first bar 51 or second bar 52, as well as the receiving area 57 for attaching a post 53, for example by means of insertion or plugging. Above the receiving area 57, a borehole 58 is shown in which the pin 59 for holding the bands 54 can be inserted. Above the borehole 58, two screw points 65 are shown, to which holders 66 (cf. FIG. 4) can be screwed for fixing a connecting pin. Here, the axes 73 of the screw points 65 can serve to guide the holders 66, so that, for example, a connecting pin 67 mounted in the connecting eye 64 of an adjacent connection element 55 of another framework 50 can be received, centred and finally fixed. On the opposite side, an upper extension 62 can be seen with a corresponding connecting eye 64 for inserting a connecting pin 67 (not shown here; cf. FIG. 4).

FIG. 4 shows two connection elements 55 and an embodiment of how the two connection elements 55 are joined to form a node 80. Such a connection situation arises, for example, when two frameworks 50 according to the invention are to be joined to each other in order to build a framework structure module 70 or an offshore load-bearing structure module 80. In FIG. 4, holders 66 are used which are approximately triangular in shape. A connecting pin 67, which has conical ends 72, can be received and locked via a funnel-shaped opening 71. For this purpose, the holders 66 can, for example, be gradually brought together via screw bolts (not shown) guided along the axes 73 of the screw points 65. In this way, when assembling two frameworks 50 according to the invention, the two holders 66 can be pre-fixed, for example, at a distance greater than the axial length of the connecting pin 67. The connecting pin 67 inserted in the connecting eye 64 is received between the two holders 66 when the holders 66 are brought closer together with their funnel-shaped openings 71 facing each other. When the two holders 66 approach each other, the connecting pin 67 is received in the funnel-shaped receiving areas 71 of the holders 66 and is thereby centred and finally fixed.

FIG. 4 also shows a transverse borehole 68 in the connecting pin 67, into which a connector 69 can be inserted for tensioning a framework structure module 70. In FIG. 4, this transverse borehole 68 is aligned in the plane spanned by the longitudinal directions 61 of the bars 51, 52, which, as explained above, can also be at an angle to it if tensioning is to be implemented in the direction of the space diagonals of a framework module 70.

FIG. 5 shows an alternative embodiment of a node 81 to that shown in FIG. 4. The node 81 has two connection elements 55, each comprising a flange 56, to which bars 51, 52 are joined. The two connection elements 55 are connected to each other by means of the holders 66 and the extensions 62. Here, holders 66 in conjunction with extensions 62 fix connecting pins 67 in both axial and radial directions. These connecting pins 67 can have receiving areas, such as transverse boreholes 68 for further components. In the embodiment shown here, the holders 66 have, for example, an almost square shape when viewed from above. However, as with the other components, the person skilled in the art will generally use their freedom of design in achieving a skilled construction of the holders 66 to adapt the components required according to the invention to the specific requirements, for example on site.

The connection elements 55 further provide receiving areas 57 for the posts 53 and boreholes 58 into which pins 59 can be inserted. The node 81 also comprises two other connection elements 55, which are characterised by a simplified shape as they do not have flanges 56. These additional connection elements 55 can be used, for example, to receive attachment part holding devices 96. The node 81 is, for example, a corner node 82 of a load-bearing frame 80 according to the invention, in which the unattached connection elements 55, to which no bars 51, 52 are connected, can be made simpler, for example in order to save material and therefore costs in production. However, by means of these additional connection elements 55, additional posts 53 can also be locked parallel to the posts 53 of the frameworks 50 in order to be able to provide the same functionality in the corner points or corner edges with regard to the posts 53 as is possible between nodes 84 arranged internally in the load-bearing frame 80. These additional connection elements 55 can be transferred analogously to the T-nodes 83.

FIG. 6 shows a framework structure module 70, also known as a framework module 70, which is constructed from four frameworks 50 according to the invention. In this case, the first bars 51 each form a substantially rectangular base area. The top surface, which is substantially rectangularly spanned by the second bars 52, is supported by two posts 53 on each of the respective side edges, spaced parallel to each other. The frameworks 50 according to the invention are tensioned via bands 54, which are supported on the "outer surfaces" of the respective framework 50. The individual frameworks 50 are held together by connection elements 55, as shown for example in FIG. 4, and tensioned by connectors 69 which run diagonally in the base or top surface. The individual connectors 69 and the bands 54 each have tensioning devices 60, for example for joining and tensioning the connectors 69 and the bands 54.

FIG. 7 shows an offshore load-bearing frame 80 constructed in a planar manner which is made up of several framework structure modules 70, with the framework 50 according to the invention forming the basic unit. The person skilled in the art will recognise that in the embodiment of FIG. 7, 17 individual frameworks according to the invention are joined to each other, whereby diagonal struts 69 are arranged for further tensioning of the load-bearing frame 80 in each of the six top surfaces and six base surfaces which are formed.

FIG. 8 shows an example of a framework module 70 on which floating bodies 100 are arranged on the first bars 51 or in extension of the posts 53. These floating bodies 100 which are arranged at the respective connection points of the first bars 51 of adjacent frameworks 50 consist of individual torus-segment-like pontoons 1, each of which is buoyant itself. This type of construction of the floating bodies 100 is preferred, firstly in order to reduce the transport volume of the floating bodies and secondly in order to ensure a lower probability of failure of the floating bodies 100. Should one of the torus-segment-like pontoons leak during operation, it can be replaced individually; it is not necessary to replace the floating body 100 in its entirety. Another advantage of this segment-like construction is that the weight and the volume of the individual segments is much less than the total weight or total volume of the floating bodies 100, thereby facilitating assembly.

FIG. 9 shows an offshore load-bearing frame structure 80 which is made up of six framework structure modules 70 according to FIG. 8. Here it can also be seen that each module 70 is formed from four frameworks 50 according to the invention, with adjacent modules exhibiting a common framework 50. The double posts 53 on the outer side edges of the load-bearing frame structure modules 70 are characteristic of this. The two inner nodes exhibit four vertical posts 53 accordingly. The connections forming T-nodes on the side surfaces accordingly have three vertical posts 53.

FIG. 10 shows a further embodiment of an offshore load-bearing frame 80 according to the invention, which shows a chessboard-like structure extending in a substantially planar manner over a water surface. Such a chessboard-like load-bearing frame 80 is also constructed from frameworks 50 according to the invention, which are used as basic building blocks. In these frameworks 50, both the first bars 51 and the second bars 52 as well as the posts 53 can be designed as hollow bodies, each of which is closed in a fluid-tight manner by the connection elements 55. In this way, a single framework 50 can be positioned lying or floating on a water surface, with the bars 51, 52 and possibly the posts 53 providing more buoyancy than is required by the weight force of the framework 50 according to the invention. A framework 50 according to the invention is extended here, for example, by three further frameworks 50, to which it is connected via the connection elements 55, more precisely via the holders 66 and the extensions 62 of the connection elements 55, in such a way that a chessboard-like pattern is created, in which frameworks 50 and "empty" spaces are arranged alternately. Two of the frameworks 50 shown additionally have support structures 90 which are supported on the posts 53 or, in other embodiments, additionally or alternatively on the bars 51, 52. The support structures 90 can serve, for example, as mountings for solar modules, containers, floor panels or other add-on components 95 and/or enable movement over the framework structure according to the invention. The support structures 90 shown here are specially adapted to the loads caused, for example, by attachments 95, such as solar panels, or the wind load on them, etc. This means that the structure of the support structures 90 is designed in such a way that it is most resistant where the component loads caused by the solar modules are greatest. Depending on the application, another design of the support structures 90 is also conceivable. The support structures 90 can either be supported directly on the bars 51, 52 and/or on the posts 53, or they can be held in place by attachment holding devices 96.

In order to stabilize the position of the four frameworks 50 according to the invention shown in FIG. 10 in relation to each other, either fixing means 92 (not shown here) can be used or some of the free connection elements 55 can be connected to further bars 510, 520 or further posts 530, so that a substantially rectangular overall structure is created which is torsionally rigid in itself. FIG. 11 shows such a load-bearing frame 80 in a square embodiment based on two frameworks 50 according to the invention, which are extended with further bars 510, 520 or posts 530 provided with connection elements 55 according to the invention. In this embodiment, both the first and second bars 510, 520 and the posts 530 may be identical parts, making them interchangeable as desired. In other embodiments, only the additional first and second bars 510 and 520 are identical in construction to each other and identical in construction to the first and second bars 51 and 52. The posts 53 and 530 can also be identical in construction, but differ from the first and second bars 51, 52, 510 and 520 in length, diameter or buoyancy, for example. The buoyancy of such a chessboard-like structure 80 with extension can be additionally increased— as shown in FIG. 11— by floating bodies 100.

Furthermore, the additional individually inserted posts 530 and bars 510 and 520 provided with connection elements 55 are connected to the frameworks 50 according to the invention by means of bands 54 so as to further increase the rigidity of the load-bearing frame 80. The fastening of floats 100 under the load-bearing frame 80 or between the load-bearing frame 80 and the water surface increases the distance of attachments 95 arranged on the load-bearing frame 80 from the water surface, thereby reducing the risk of the attachments 95 being wetted with water, or even being flooded in the event of swell and/or strong gusts of wind. Additional buoyancy aids 99 are attached to some posts 53 or bars 51, 52 to further increase the buoyancy of the offshore load-bearing frame 80. These flotation aids 99 can, for example, be designed to be mountable or dismountable.

FIG. 12 shows a cuboid framework structure module 70 which forms part of a wave power plant. In this exemplary module 70 shown, floating bodies 100 are arranged between the first bars 51 and the second bars 52 of the respective frameworks 50 according to the invention. The segmented construction of the floating body 100 makes it possible to assemble the floating body from individual floating body segments and integrate them in the framework structure module 70, even if the framework structure module 70 has already been assembled. Equally, however, the floating bodies 100 can also be attached to the framework structure module 70 at the start of the assembly process if, for example, it is necessary to generate additional buoyancy during the assembly process. The floating bodies 100 can thereby oscillate along the posts 53 and move lifting rods 25 in linear fashion up and down along a longitudinal axis 27 of the lifting rods. These lifting rods 25 are joined to linear generators 110 in such a way that the linear lifting movement of the lifting rods 25 is converted into rotational movements of drive shafts of the linear generators 90 so that wave energy can be converted into electrical energy according to the dynamo principle.

FIG. 13 shows two frameworks 50 which are connected to each other by means of holders 66 and extensions 62 of the connection elements 55 arranged on the bars 51, 52. The method according to the invention was used to connect the frameworks 50. For this purpose, the two frameworks 50 are initially arranged lying on the water surface. After the weight of the first bars 51 has been increased, or the buoyancy of the first bars 51 has been reduced, the frameworks 50 float in the water aligned vertically to the water surface. Here, the buoyant second bars 52 and the connection elements arranged thereon are still at or above the water surface and are therefore easily accessible. By connecting the two connection elements 55, which are arranged at the two second bars 52, to an upper node 81, an angular structure is created from the top view.

In order to ensure that the two posts 53 mounted below the upper node 81 maintain their relative position to each other, including during offshore installation and in swell, at least one stabilizing device 91 is attached to the frameworks 50, preferably directly to the posts 53 to be stabilized. Preferably, these stabilizing devices 91 can slide along the posts 53 so that they are mountable on the surface of the water, but then sink towards the bottom of the water so that the lever arm of the stabilizing holding torques is increased as the stabilizing device approaches the lower node 81.

In a further embodiment of the invention, fixing means 92 may be provided for temporarily locking the angle between the planes of the frameworks 50 as viewed from above. These fixing means 92 are preferably mounted between the second bars 52, which are easily accessible from the water surface. This is a simple way of preventing any change in the angle between the two frameworks 50 as viewed from above. This significantly facilitates the positioning of a unit consisting of two frameworks 50 according to the invention as compared to other framework structure modules or offshore load-bearing frames and therefore also facilitates the assembly of extended framework structures.

According to the invention, the ratio between buoyancy and weight of the first bars 51 is subsequently increased again, so that the two frameworks 50 connected at the top retain their orientation and rise towards the water surface— i.e. approximately vertically— until the first bars 51 are floating on the water surface. Since the connection elements 55 of the first bars 51 are now also easily accessible for assembly purposes, the two frameworks can be connected in a simple manner by means of the connection elements 55 arranged on the first bars 51 at a second, lower node 81. Due to the stabilizing devices 91, the position of the posts 53 in relation to each other is already relatively precisely determined, i.e. the posts 53 are already aligned parallel to each other. This eliminates the need for time-consuming positioning of the connection elements 55 arranged on the first bars 51 over long distances. In this method step, therefore, only finetuning is required.

It goes without saying that further floating bodies 100 can be arranged at the lower ends of the offshore framework structure module 70 according to FIG. 12 below the first bars 51, as shown for example in FIG. 14. FIG. 14 shows a wave power plant 200 constructed from six framework structure modules 70 according to FIG. 12. Here, the frameworks 50 of the framework structure module 70, which is buoyant in itself according to the invention, are provided with additional floating bodies 100 at the individual nodes 81 to 84 in order to give the wave power plant greater buoyancy.

The floating bodies 100 arranged between the first bars 51 and the second bars 52 can move in an oscillating manner along the side bars 53 following the passage of a wave. This raises and lowers the lifting rods 25 and drives the shafts of the linear generators 110 to convert wave energy into electrical energy. It is readily comprehensible for a person skilled in the art that such a wave power plant 200 can also be designed in much larger dimensions with multiple movable floating bodies 100, whereby the self-stabilization of the offshore framework structure 70 or load-bearing frame 80 increases with the increase in the planar expansion of the wave power plant 20, so that a wave can pass through the wave power plant 200 or through the load-bearing frame 80, whereby the overall structure does not follow the wave movement.

FIG. 15 shows a floating offshore load-bearing frame structure 80 constructed from a plurality of offshore load-bearing frame structure modules 70. The load-bearing frame 80 consists of four framework structure modules 70 which have been joined together by means of the connection elements 55 to form a load-bearing frame composite 80. At some corner points 82 of the framework modules 70, floating bodies 100 are arranged movably—for example according to the embodiment shown in FIG. 12—or also in a stationary manner with the load-bearing structure 80, depending on whether wave energy is to be tapped by means of the movement of the floating bodies or the floating bodies are only intended to increase the buoyancy of the load-bearing structure 80. The offshore load-bearing frame 80 according to FIG. 15 has a number of regenerative energy generators, for example photovoltaic modules, wind turbines and also point absorbers for converting wave energy, some of which are movably attached to the offshore load-bearing frame 80 as attachments 95. In addition, a carriage 97 is shown which serves as a means of transport for tools, components or persons, etc. on the framework structure. Here, the carriage-like transport means 97 can slide on rails provided by the support structures 90, whereby the carriage 97 slides over the photovoltaic modules, for example. A hanging, basket-like arrangement, e.g. on the support structures 90, is also a conceivable embodiment. Such an offshore load-bearing frame structure 80 can be attached to the bottom of the water by means of a mooring system 93 and in this way can be used as a kind of floating island for energy generation, storage and distribution.

By means of the openings 75 in the first bars 51 and by means of pipes which can be connected to the openings 75, a fluid connection can be established between the cavities of the first and/or second bars 51, 52 which are closed by the connection elements 55. This forms a fluid conduit system in which, for example, cooling fluid can be circulated. By means of such an installation, the waste heat from attachments 95 requiring cooling, which are arranged in or on the offshore load-bearing frame 80, can be efficiently dissipated to the body of water on which the load-bearing frame 80 according to the invention is floating.

All in all, the buoyant framework 50 according to the invention can provide a variety of possible load-bearing structures 70 or load-bearing frames 80 for a very diverse range of offshore applications, of which the application shown for a wave power plant 200 is only one example among many. For the purpose of the invention, all of the load-bearing structures 80 according to the invention can be expanded in a modular manner with the basic unit of the framework 50 according to the invention and be enlarged in this way. Furthermore, the simple design of the frameworks 50 and the load-bearing structure modules 70 and the modular construction of the floating bodies 100 allows easy assembly according to the invention, which later also provides for reduced maintenance, since damaged units can easily be replaced in a modular manner.

| List of reference numerals | |
|---|---|
| 25 | Lifting rod |
| 27 | Lifting rod - longitudinal axis |
| 50 | Framework |
| 51, 510 | First bar |
| 52, 520 | Second bar |
| 53, 530 | Post |
| 54 | Bands |
| 55 | Connection element |
| 56 | Flange |
| 57 | Receiving areas |
| 58 | Borehole |
| 59 | Pin |
| 60 | Tensioning device |
| 61 | Bar - longitudinal direction |
| 62 | Extensions |
| 63 | Post - longitudinal direction |
| 64 | Connecting eye |
| 65 | Screw point |
| 66 | Holder |
| 67 | Connecting pin |
| 68 | Transverse borehole |
| 69 | Connector |
| 70 | Framework structure module |
| 71 | Funnel-shaped receiving area |
| 72 | Conical end |
| 73 | Axis - screw points |
| 75 | Opening |
| 80 | Load-bearing frame |
| 81 | Node |
| 82 | Corner node |
| 83 | T-node |
| 84 | Inner node |
| 90 | Support structures |
| 91 | Stabilizing device |
| 92 | Fixing means |
| 93 | Mooring |
| 95 | Attachments |
| 96 | Attachment holding device |
| 97 | Means of transport |
| 99 | Flotation aids |
| 100 | Floating bodies |
| 110 | Linear generator |
| 200 | Wave power plant |

The invention claimed is:

1. A framework for a modular construction of an offshore framework structure comprising:
a first bar functioning as a floating body, a second bar, two posts for substantially parallel support of the first and second bars and two bands for tensioning the framework, wherein at each end of the first and second bars a connection element is arranged, which exhibits:
a single flange for connecting only one of the first and second bars in a longitudinal direction to the connection element;
receiving areas for joining the two posts to the first and second bars transversely to the longitudinal direction of the first and second bars;
securing means for fastening the two bands provided with tensioning devices so that the framework can be held in shape respectively diagonally tensioned by means of the tensioning devices,
wherein the connection elements are constructed with respect to the longitudinal direction of the first and second bars in such a way that an extension is configured on one side of each connection element and a holder is arranged on an opposite side of each connection element so that the extension of a connection element of the framework can be connected by means of the holder of another connection element of a further framework.

2. The framework according to claim 1, wherein the first bar and/or the second bar and/or the posts have a round cross-section and/or are designed as hollow bodies and/or are provided with buoyancy bodies.

3. The framework according to claim 1, wherein the flange and the ends of the first and second bars are configured such that the flange seals one end of the first bar and/or of the second bar in a fluid-tight manner.

4. The framework according to claim 1, wherein the second bar and/or the posts act as a floating body in addition to the first bar.

5. The framework according to claim 1, wherein, in extension of at least one of the posts or parallel to the plane of the framework, a floating body, a part of a mounting or a part of a holder for a platform or a lifting device is arranged.

6. The framework according to claim 1, wherein a buoyancy-to-weight ratio of at least the first bar is variable, by flooding means by means of which the first bar can be filled with water or emptied of water, or by weighting means dismountably attachable to the first bar, which increase or decrease the weight and/or buoyancy of the first bar, and wherein the second bar is also buoyant.

7. The framework according to claim 2, wherein the first bar is formed as a hollow body and the first bar or one of the connection elements attached to the first bar has an opening through which at least the first bar can be filled with water or emptied of water and which can be closed in a watertight manner.

8. An offshore load-bearing frame formed of at least two of the frameworks according to claim 4, wherein the frameworks are arranged to float substantially on a water surface and are connected in a rectangular grid manner to form a structure extending along the water surface by means of connection elements arranged in corners of the frameworks.

9. The offshore load-bearing frame according to claim 8, wherein the bands, which can be fixed to the securing means of the connection elements and are provided with the tensioning devices, can be tensioned in free spaces of the rectangular grid offshore structure in such a way that the free spaces are held in shape or are tensioned diagonally by means of the tensioning devices.

10. The offshore load-bearing frame according to claim 8, wherein the connection elements, parts of the connection elements or the holders connecting two connection elements to each other are elastically deformable when two adjacent frameworks undergo relative movement with respect to each other.

11. A framework structure module formed from three or more of the frameworks according to claim 1, which are joined via the connection elements to form a straight triangular, rectangular, or polygonal prismatic structure, wherein the first bars functioning as floating bodies span a substantially triangular, rectangular, or polygonal base surface, the second bars span a substantially triangular, rectangular, or polygonal top surface congruent with the base surface, and two posts of two adjacent frameworks each form a side edge, the connection elements of the respective frameworks exhibiting securing means to which connectors provided with tensioning devices can be fastened in order to join two frameworks of the framework structure module to one another at non-adjacent ends.

12. The framework structure module according to claim 11, wherein the connectors extend substantially in the base surface and/or the top surface plane and/or along a space diagonal, and the connectors are receivable in a transverse borehole formed in a connecting pin.

13. The framework structure module according to claim 11, wherein the framework structure module is buoyant solely due to a buoyant force of the first bars.

14. The framework structure module according to claim 11, wherein one or more of the group consisting of floating bodies, mountings, attachment holding devices, platforms, wind turbines, and cranes are attachable to a node formed by the connecting elements and/or to one or more of the first and second bars.

15. The framework structure module according to claim 11, wherein one or more support structures are arranged in a top surface spanned by the second bars and/or in a bottom surface spanned by the first bars and/or in an intermediate plane, wherein the support structures are supported on opposing first bars or second bars and/or on the connectors in such a way that superstructures can be supported on the support structures.

16. The framework structure module according to claim 14, wherein one or more support structures comprise rail tracks by means of which carriage or basket means of transport can be moved between the first bars or the second bars of the framework structure module.

17. The framework structure module according to claim 11, wherein a floating body is movably arranged in the vertical direction at one or more of the side edges between the first bars and the second bars.

18. The framework structure module according to claim 11, comprising a plurality of frameworks, wherein at least some hollow bodies closed in a fluid-tight manner are connected to form a fluid conduit system via openings provided in the first and second bars or the connection elements.

19. A floating offshore load-bearing frame constructed in a modular manner from a plurality of the framework structure modules according to claim 11 for the buoyant support of holding devices, platforms, superstructures or mountings for solar installations or wind turbines.

20. A wave power plant which is constructed in a modular manner from a plurality of the framework structure modules according to claim 15, wherein the floating bodies arranged between the first bars and the second bars are arranged on movable lifting rods which are parallel to the posts and are operatively connected to drive shafts of linear generators in such a way that oscillating movements of the lifting rods cause the drive shafts of the linear generators to rotate.

21. A method for connecting at least two of the frameworks according to claim 6, comprising the following steps:
  a) arranging the frameworks on a surface of a body of water, a depth of which corresponds at least to a distance between the first bars and the respective second bars;
  b) reducing a buoyancy-to-weight ratio of the first bars so that the first bars submerge below a water surface until the frameworks are substantially vertical to the water surface, wherein the second bars continue to float at or on the water surface;
  c) connecting one connection element of each of two second bars to each other in order to connect two frameworks at a first node;
  d) attaching at least one stabilizing device to the two frameworks connected in step c) so that the adjacent posts of the two frameworks are held substantially parallel to each other;
  e) increasing the buoyancy-to-weight ratio of the first bars so that the frameworks rise, maintaining their orientation to each other and being substantially vertical to the water surface until the first bars are floating at or on the water surface;

f) connecting connection elements to each other which are respectively arranged on adjacent first bars.

22. The method according to claim 21, wherein in order to reduce the buoyancy-to-weight ratio of the first bars, weighting means are dismountably attached to the first bars or a hose is applied by means of which water is introduced into the first bar, and wherein, in order to increase the buoyancy-to-weight ratio of the first bars, either the weighting means are removed and/or the water is removed from the first bar.

23. The method according to claim 21, wherein before steps e) and f) are carried out, further frameworks are connected to previously connected frameworks according to steps c) and d).

24. The method according to claim 21, wherein, after any one of steps b) to f), fixing means are attached between two frameworks such that a predetermined angle between the two frameworks remains fixed.

25. The method according to claim 21, wherein the stabilizing device attached in step d) is attached to the posts of the two frameworks in such a way that the stabilizing device is movable in the longitudinal direction of the posts.

26. The method according to claim 21, wherein the frameworks connected to each other after step f) are moved into shallower water prior to the mounting of the attachment holding devices so that the attachment holding devices can be at least partially assembled by one or more assemblers standing on the ground.

27. The method according to claim 22, wherein after step e) the hose is removed and the first bars are closed in a watertight manner.

28. The method according to claim 21, wherein the connected frameworks are connected in a floating manner to the previously connected frameworks, to a floating framework structure module, to an offshore load-bearing frame, or to a wave power plant via the connecting elements.

29. The method according to claim 28, wherein rod-shaped components for assembly units are moved by one end from below the water surface by means of a lifting or pulling device through an area spanned between the connection elements along the posts of a framework structure module into a substantially vertical position parallel to the posts.

30. The method according to claim 21, wherein a top surface is spanned by the second bars and the flotation aids, raft devices, attachment holding devices and/or attachments can be lifted from the water surface onto the top surface or into an intermediate plane between the top surface and the water surface by means of a plurality of crane devices attached to or between the connection elements of the top surface.

* * * * *